US012659954B2

(12) United States Patent
    Choi et al.

(10) Patent No.: US 12,659,954 B2
(45) Date of Patent: Jun. 16, 2026

(54) METHOD AND APPARATUS FOR COMMUNICATION OF ENHANCED REDUCED CAPABILITY USER EQUIPMENT IN WIRELESS COMMUNICATION SYSTEM

(71) Applicant: Samsung Electronics Co., Ltd., Suwon-si (KR)

(72) Inventors: Seunghoon Choi, Suwon-si (KR); Youngbum Kim, Suwon-si (KR); Hyunseok Ryu, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 18/474,774

(22) Filed: Sep. 26, 2023

(65) Prior Publication Data

US 2024/0114508 A1    Apr. 4, 2024

(30) Foreign Application Priority Data

Sep. 30, 2022    (KR) ........................ 10-2022-0125667

(51) Int. Cl.
| | |
|---|---|
| *H04W 72/12* | (2023.01) |
| *H04L 5/00* | (2006.01) |
| *H04W 72/04* | (2023.01) |
| *H04W 72/0453* | (2023.01) |
| *H04W 72/1273* | (2023.01) |
| *H04W 72/232* | (2023.01) |
| *H04W 72/51* | (2023.01) |

(52) U.S. Cl.
CPC ... *H04W 72/1273* (2013.01); *H04W 72/0453* (2013.01); *H04W 72/232* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 11,553,535 B1 | 1/2023 | Kim | |
| 11,985,618 B2 * | 5/2024 | Narasimha | ........ H04W 74/0833 |
| 2018/0124687 A1 * | 5/2018 | Park | ...................... H04L 5/1469 |
| 2019/0141734 A1 * | 5/2019 | Lei | ........................ H04W 72/23 |

(Continued)

FOREIGN PATENT DOCUMENTS

| | | |
|---|---|---|
| KR | 10-2423063 B1 | 7/2022 |
| KR | 10-2023-0029462 A | 3/2023 |

(Continued)

OTHER PUBLICATIONS

International Search Report dated Jan. 5, 2024, issued in International Application No. PCT/KR2023/014900.

*Primary Examiner* — Sai Aung
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes obtaining information on a subset of subbands for a specific type of terminal, the subbands composing a bandwidth part, receiving, from a base station, a physical downlink control channel (PDCCH), and receiving, from the base station, a physical downlink shared channel (PDSCH) scheduled by the PDCCH, based on the subset of the subbands.

20 Claims, 13 Drawing Sheets

(56) References Cited

U.S. PATENT DOCUMENTS

| | | | | |
|---|---|---|---|---|
| 2021/0058113 A1* | 2/2021 | Jung | .................... | H04B 7/088 |
| 2021/0112589 A1* | 4/2021 | Kim | .................. | H04W 74/002 |
| 2022/0174512 A1* | 6/2022 | Rune | .................. | H04W 24/10 |
| 2022/0278802 A1* | 9/2022 | Noh | .................... | H04L 5/0053 |
| 2022/0312462 A1 | 9/2022 | He et al. | | |
| 2023/0074797 A1 | 3/2023 | Choi et al. | | |
| 2023/0318686 A1* | 10/2023 | Kwak | ................ | H04B 7/0639 |
| | | | | 455/101 |

FOREIGN PATENT DOCUMENTS

| | | | |
|---|---|---|---|
| WO | 2021/226902 A1 | 11/2021 | |
| WO | 2022/032661 A1 | 2/2022 | |
| WO | 2022/155945 A1 | 7/2022 | |

* cited by examiner

SS block (300)

METHOD AND APPARATUS FOR COMMUNICATION OF ENHANCED REDUCED CAPABILITY USER EQUIPMENT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0125667, filed on Sep. 30, 2022, in the Korean Intellectual Property Office, the disclosure of which is incorporated by reference herein in its entirety.

BACKGROUND

1. Field

The disclosure relates to a method and apparatus for communication of an enhanced reduced capability user equipment in a wireless communication system. More particularly, the disclosure relates to a method and apparatus for transmitting and receiving uplink and downlink data of an enhanced reduced capability user equipment in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

To support technologies such as sensors, surveillance cameras, and smart watches, discuss on NR Reduced Capability (RedCap) terminal standard that enables data transmission and reception by accessing the 5G communication system while reducing the complexity of the terminal has been completed in 3GPP.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting and receiving uplink and downlink data for an enhanced Reduced Capability (eRedCap) terminal, which is a terminal with further reduced capability than a typical reduced capability terminal in an NR system.

Another aspect of the disclosure is to provide a method for processing a control signal in a wireless communication system, comprising receiving a first control signal transmitted from a base station, processing the received first control signal, and transmitting a second control signal generated based on the processing to the base station.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes obtaining information on a subset of subbands for a specific type of terminal, the subbands composing a bandwidth part, receiving, from a base station, a physical downlink control channel (PDCCH), and receiving, from the base station, a physical downlink shared channel (PDSCH) scheduled by the PDCCH, based on the subset of the subbands.

In accordance with another aspect of the disclosure, a method performed by a base station in a wireless communication system is provided. The method includes transmitting information on a subset of subbands for a specific type of terminal, the subbands composing a bandwidth part, transmitting, to a terminal, a PDCCH, and transmitting, to the terminal, a PDSCH scheduled by the PDCCH, according to the subset of the subbands.

In accordance with another aspect of the disclosure, a terminal in a wireless communication system is provided. The terminal includes a transceiver and at least one processor. The at least one processor is configured to obtain information on a subset of subbands for a specific type of terminal, the subbands composing a bandwidth part, receive, from a base station via the transceiver, a PDCCH, and receive, from the base station via the transceiver, a PDSCH scheduled by the PDCCH, based on the subset of the subbands.

In accordance with another aspect of the disclosure, a base station in a wireless communication system is provided. The base station includes a transceiver and at least one processor. The at least one processor is configured to transmit, via the transceiver, information on a subset of subbands for a specific type of terminal, the subbands composing a bandwidth part, transmit, to a terminal via the transceiver, a PDCCH, and transmit, to the terminal via the transceiver, a PDSCH scheduled by the PDCCH, according to the subset of the subbands. According to an embodiment of the disclosure, an enhanced reduced capability terminal can efficiently transmit and receive uplink and downlink data in an NR system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures

DETAILED DESCRIPTION

Figure 1:
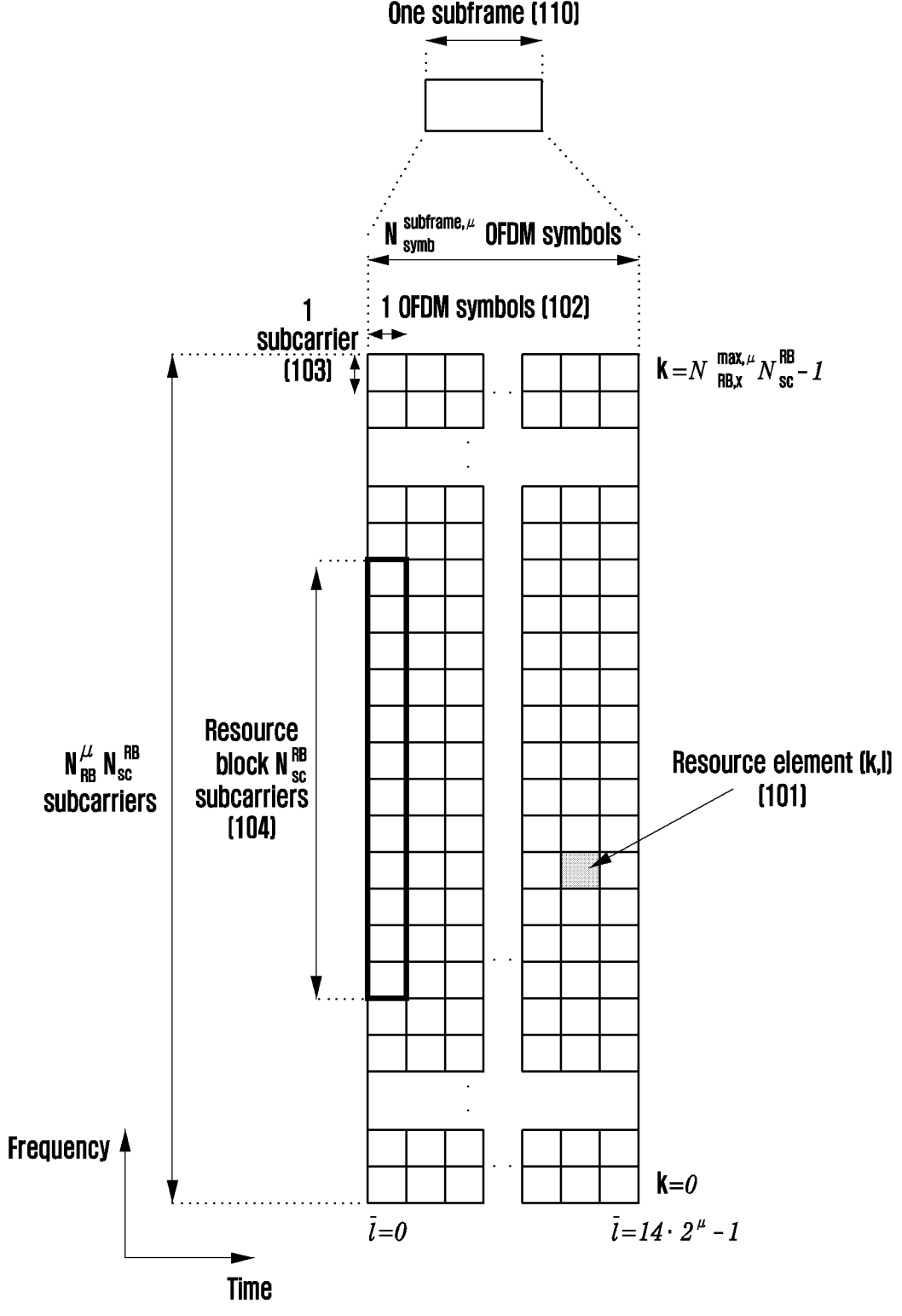
FIG. 1 is a diagram illustrating a basic structure of a time-frequency domain, which is a radio resource domain, in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

In the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

In the accompanying drawings, some components may be exaggerated, omitted, or schematically illustrated. The size of each component does not completely reflect the actual size. In the drawings, identical or corresponding components are provided with identical reference numerals.

The advantages and features of the disclosure and ways to achieve them will be apparent by making reference to embodiments as described below in detail in conjunction with the accompanying drawings. The disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. In describing the disclosure, a detailed description of related functions or constitutions will be omitted when it is determined that the description may make the subject matter of the disclosure unnecessarily unclear. The terms which will be described below are terms defined in consideration of the functions in the disclosure, and may be different according to users, intentions of the operators, or customs. The definitions of the terms should be made based on the contents throughout the specification.

In the following description, a base station is an entity that allocates resources to terminals, and may be at least one of a gNode B, an eNode B, a Node B, a base station (BS), an access point (AP), a wireless access unit, a base station controller, and a node on a network. A terminal may include at least one of a user equipment (UE), a mobile station (MS), a cellular phone, a smartphone, a smartwatch, a wearable device, a computer, and a multimedia device capable of performing communication functions. In the disclosure, a downlink (DL) refers to a radio link path via which a base station transmits a signal to a terminal, and an uplink (UL) refers to a radio link path via which a terminal transmits a signal to a base station. In the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the 5G may be the concept that covers the exiting LTE, LTE-A, or other similar services. Additionally, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block(s). Additionally, these computer program instructions may also be stored in a computer usable or computer-readable memory that can direct a computer or other programmable data processing apparatus to function in a particular manner, such that the instructions stored in the computer usable or computer-readable memory can produce an article of manufacture including instruction means that implement the function specified in the flowchart block(s). The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block(s).

Each block may represent a module, segment, or portion of code, which includes one or more executable instructions for implementing the specified logical function(s). It should also be noted that in some alternative implementations, the functions noted in the blocks may occur out of the order. In an example, two blocks shown in succession may in fact be executed substantially concurrently or the blocks may sometimes be executed in the reverse order, depending upon the functionality involved.

As used in embodiments of the disclosure, the 'unit' refers to a software component or a hardware component, such as a Field Programmable Gate Array (FPGA) or an Application Specific Integrated Circuit (ASIC), which performs a predetermined function. However, the 'unit' does not always have a meaning limited to software or hardware. The 'unit' may be constructed either to be stored in an addressable storage medium or to execute one or more processors. The 'unit' includes, for example, components such as software components, object-oriented software components, class components, and task components, processes, functions, properties, procedures, sub-routines, segments of a program code, drivers, firmware, micro-codes, circuits, data, database, data structures, tables, arrays, and parameters. The components and functions provided by the 'unit' may be either combined into a smaller number of components and a 'unit', or divided into a larger number of components and a 'unit'. Moreover, the components and 'units' may be implemented to reproduce one or more CPUs within a device or a security multimedia card. Further, in the embodiments, the '~unit' may include one or more processors.

Embodiments of the disclosure will be described in detail with reference to the accompanying drawings. The method and apparatus proposed in the embodiments of the disclosure will be described by taking an IoT service (IWSN, surveillance camera, wearable, etc.) as an example, but are not limited to each embodiment. The apparatus and method may also be applied to downlink reception and uplink transmission methods corresponding to other additional services by using all or a combination of one or more embodiments proposed in the disclosure. The embodiments of the disclosure are applicable through partial modifications within a range without significantly departing from the scope of the disclosure, by judgement by those skilled in technical knowledge (i.e., those skilled in the art).

In describing the disclosure, a detailed description of related functions or constitutions will be omitted when it is determined that the description may make the subject matter of the disclosure unnecessarily unclear. The terms which will be described below are terms defined in consideration of the functions in the disclosure, and may be different according to users, intentions of operators, or customs. The definitions of the terms should be made based on the contents throughout the specification.

Beyond the early voice-oriented services, a wireless communication system has been developed as a broadband wireless communication system that provides a high-speed and high-quality packet data service, such as 3GPP High Speed Packet Access (HSPA), Long Term Evolution (LTE) or Evolved Universal Terrestrial Radio Access (E-UTRA), LTE-Advanced (LTE-A), LTE-Pro, 3GPP2 High Rate Packet Data (HRPD), Ultra-Mobile Broadband (UMB), communication standards including IEEE's 802.16e, and the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a terminal transmits data or a control signal to a base station and the down link refers to a radio link through which a base station transmits data or a control signal to a terminal. Additionally, the multiple access scheme as described above generally allocates and operates time-frequency resources including data or control information to be transmitted to each user to prevent the time-frequency resources from overlapping with each other, that is, establish orthogonality, thereby dividing the data or the control information of each user.

In an embodiment, a 5G communication system, which is a beyond LTE communication system, is required to freely reflect various requirements of users and service providers so that the services satisfying the various requirements should be supported at the same time. Services considered for the 5G communication system include enhanced mobile broadband (eMBB), massive machine-type communication (mMTC), ultra-reliability low latency communication (URLLC), etc.

The eMBB is aimed at providing more enhanced data rates than a data transmission speed that an existing LTE, LTE-A, or LTE-Pro supports. In an example, in the 5G communication system, the eMBB is required to provide 20 Gbps peak data rate in a downlink and 10 Gbps peak data rate in an uplink in terms of a single BS. Furthermore, the 5G communication system may need to provide increasing user perceived data rate while providing the peak data rate. To satisfy these requirements, enhancement of various technologies for transmission or reception including multi-input multi-output (MIMO) transmission technologies may be required. While the LTE system may use up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

The mMTC is under consideration to support application services, such as the Internet of things (IoT), in the 5G communication system. To efficiently provide the Internet of things, the mMTC should satisfy requirements, such as massive terminal connection support in a cell, terminal coverage improvement, improved battery time, and terminal cost reduction. Since the Internet of things is attached to various sensors and various devices to provide communication functions, it should support a large number of terminals (e.g., 1,000,000 terminals/$km^2$) in the cell. Since the UE supporting the mMTC is highly to be located in a shaded area that the cell cannot cover, such as basement of a building, due to the service characteristics, and thus requires a wider coverage compared to other services provided by the 5G communication system. The UE supporting the mMTC should be inexpensive, and requires very long battery lifetime, such as 10 to 15 years, since it is difficult to frequently replace a battery of the UE.

The URLLC is a cellular-based wireless communication service used for a specific purpose (mission-critical). For example, services may be used for remote control of a robot or machinery, industrial automation, unmanned aerial vehicle, remote health care, emergency alert, and the like. The communication provided by the URLLC should provide very low latency and very high reliability. In an example, a service supporting the URLLC should satisfy air interface latency that is shorter than 0.5 ms and requires a packet error rate of $10^{-5}$ or less at the same time. For the service supporting the URLLC, the 5G system should provide a transmit time interval (TTI) that is smaller than those of other services, and also requires to allocate wide resources in the frequency band in order to secure reliability of a communication link.

The three services of the 5G communication system (hereinafter, which is interchangeable with the 5G system), i.e., eMBB, URLLC, and mMTC, may be multiplexed and transmitted in one system. Different transmission/reception techniques and transmission/reception parameters may be used to satisfy different requirements of the respective services.

A frame structure of the 5G system will be described in more detail with reference to the drawings. A wireless communication system to which the disclosure is applied will be described by taking the constitution of a 5G system as an example for convenience of description, but embodiments of the disclosure may be applied in the same or similar manner even in 5G or higher systems or other communication systems to which the disclosure is applicable.

FIG. 1 is a diagram illustrating a basic structure of a time-frequency domain, which is a radio resource domain, in a wireless communication system to which according to an embodiment of the disclosure.

Referring to FIG. 1, a horizontal axis represents a time domain, and a vertical axis represents a frequency domain. In an embodiment, a basic unit of a resource in the time and frequency domains, which is a resource element (RE) 101, may be defined as one orthogonal frequency division multiplexing (OFDM) symbol (or discrete Fourier transform spread OFDM (DFT-s-OFDM) symbol) 102 in the time axis and one subcarrier 103 in the frequency axis.

$$N_{sc}^{RB}$$

consecutive REs (for example, 12) indicating the number of subcarriers per resource block (RB) in the frequency domain may compose one RB 104. In addition, $$N_{symb}^{subframe}$$

consecutive OFDM symbols indicating the number of symbols per subframe in the time domain may compose one subframe 110. For a more detailed description of the resource structure in the 5G system, reference may be made to the TS 38.211 section 4 standard.

Figure 2:
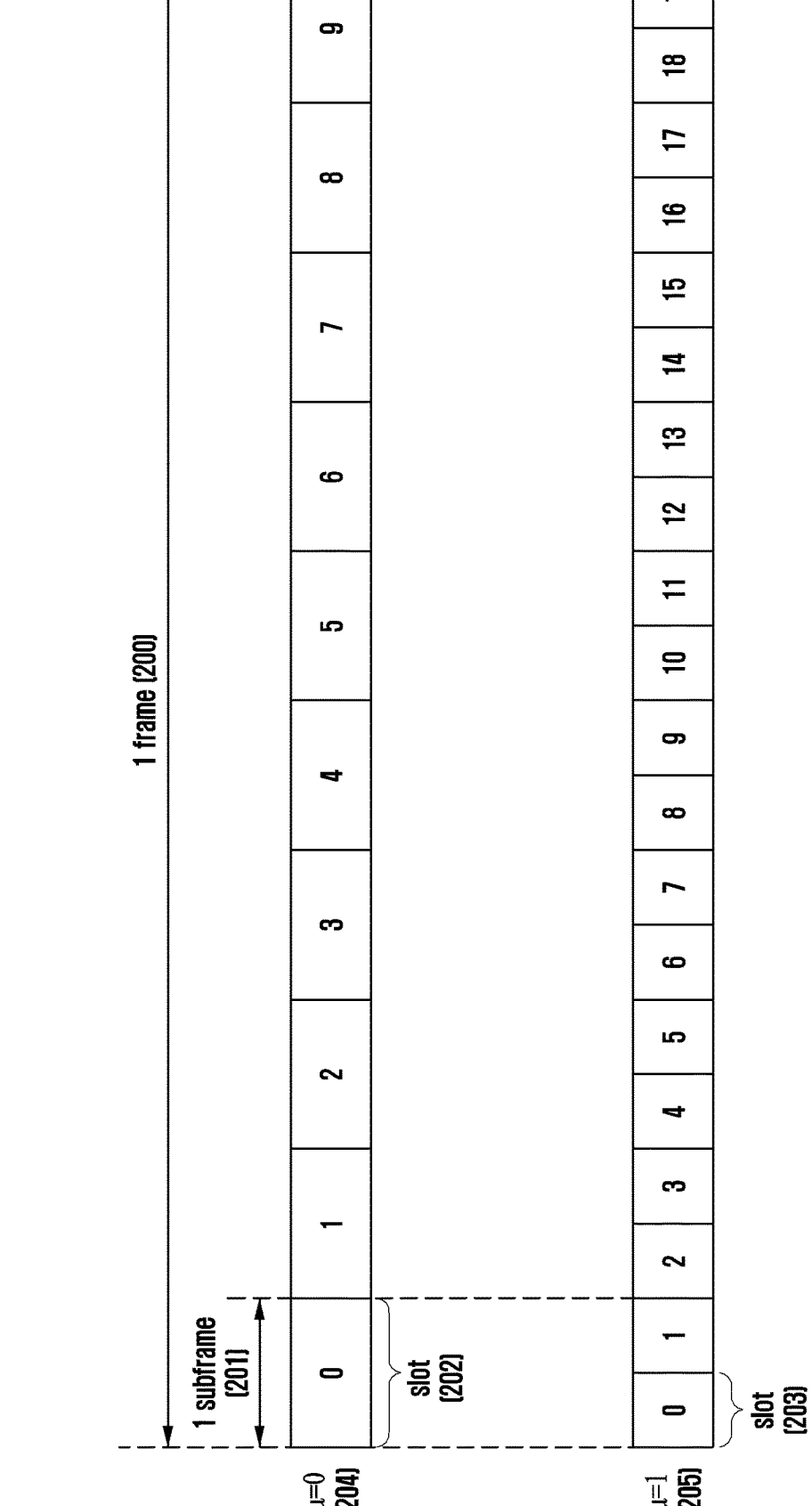
FIG. 2 is a diagram illustrating a slot structure considered in a wireless communication system according to an embodiment of the disclosure.

FIG. 2 is a diagram illustrating a slot structure considered in a wireless communication system according to an embodiment of the disclosure.

FIG. 2 illustrates an example of a structure including a frame 200, a subframe 201, and a slot 202. One frame 200 may be defined as 10 ms. One subframe 201 may be defined as 1 ms, and thus, one frame 200 may include a total of 10 subframes 201. In addition, one slot 202 and 203 may be defined as 14 OFDM symbols (i.e., the number of symbols $$\left(N_{symb}^{slot}\right)$$

per one slot=14). One subframe 201 may include one or multiple slots 202 and 203, and the number of slots 202 and 203 per one subframe 201 may vary according to a configured value, μ204 and 205 for a subcarrier spacing.

Referring to FIG. 2, it illustrates a slot structure in case of μ=0 204 and μ=1 205 for the subcarrier spacing configuring value. In case of μ=0 204, one subframe 201 may include one slot 202, and in case of μ=1 205, one subframe 201 may include two slots 203. The number of slots $$\left(N_{slot}^{subframe,\mu}\right)$$

per one subframe may vary according to the configured value μ for a subcarrier spacing, and accordingly, the number of slots $$\left(N_{slot}^{frame,\mu}\right)$$

per one frame may vary. The $$N_{slot}^{subframe,\mu}$$

and the $$N_{slot}^{frame,\mu}$$

according to each subcarrier spacing configuring μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (which may be interchangeable with an SSB, an SS block, an SS/PBCH block, etc.) may be transmitted for initial access of a UE, and the synchronization signal block may include a primary synchronization signal (PSS), a secondary synchronization signal (SSS), and a physical broadcast channel (PBCH). In the initial access phase in which the UE accesses the system, the UE first acquires downlink time and frequency domain synchronization from a synchronization signal through cell search and acquires a cell ID. The synchronization signal includes PSS and SSS. Additionally, the UE receives the PBCH for transmitting a master information block (MIB) from the base station, and acquires system information related to transmission and reception, such as system bandwidth or relevant control information, and a basic parameter value. Based on this information, the UE may perform decoding on a physical downlink control channel (PDCCH) and a physical downlink shared channel (PDSCH) to acquire a system information block (SIB). The UE exchanges UE-related identification information with the base station through a random access procedure, and initially accesses the network through procedures such as registration and authentication.

The cell initial access operation procedure of the 5G wireless communication system will be described in more detail with reference to the drawings.

The synchronization signal, which is a reference signal of the cell search, is transmitted by applying a subcarrier spacing suitable for a channel environment such as phase noise to each frequency band. The 5G base station may transmit a plurality of synchronization signal blocks according to the number of analog beams to be operated. For example, PSS and SSS may be mapped over 12 RBs and then transmitted, and PBCH may be mapped over 24 RBs and then transmitted. A structure in which a synchronization signal and a PBCH are transmitted in a 5G communication system will be described.

Figure 3:
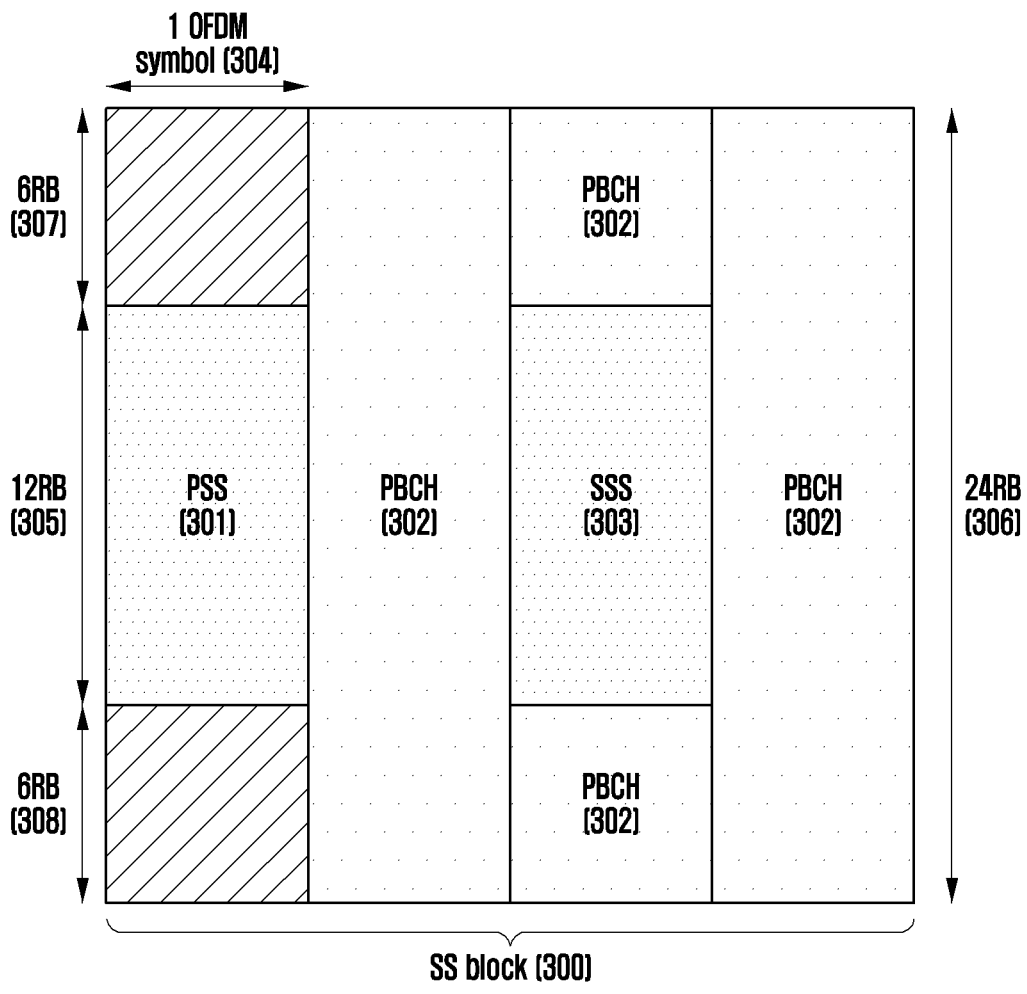
FIG. 3 is a diagram illustrating a synchronization signal block considered in a wireless communication system according to an embodiment of the disclosure.

FIG. 3 is a diagram illustrating a synchronization signal block considered in a wireless communication system according to an embodiment of the disclosure.

Referring to FIG. 3, a synchronization signal block (SS block) 300 includes a PSS 301, an SSS 303, and a broadcast channel (PBCH) 302.

As illustrated in FIG. 3, the SS block 300 is mapped to four OFDM symbols 304 in the time axis. The PSS 301 and the SSS 303 may be transmitted through 12 RBs 305 in the frequency axis and through the 1st and 3rd OFDM symbols in the time axis, respectively. In the 5G system, for example, a total of 1008 different cell IDs may be defined, and the PSS 301 may have three different values and the SSS 303 may have 336 different values according to the physical layer ID of a cell. The UE may acquire one of (336×3=)1008 cell IDs, based on a combination of the PSS 301 and the SSS 303 through detection thereof. This may be expressed as Equation 1 below.

$$N_{ID}^{cell} = 3N_{ID}^{(1)} + N_{ID}^{(2)} \qquad \text{Equation 1}$$

Here, $N^{(1)}_{ID}$ may be estimated from the SSS 303 and may have a value between 0 and 335. $N^{(2)}_{ID}$ may be estimated from PSS 301 and may have a value between 0 and 2. $N^{cell}_{ID}$ value, a cell ID, may be estimated by the UE from a combination of $N^{(1)}_{ID}$ and $N^{(2)}_{ID}$.

The PBCH 302 may be transmitted through resources including 24 RBs 306 in the frequency axis and 6 RBs 307 and 308 at both sides except for the central 12 RBs in which the SSS 303 is transmitted in the 2nd to 4th OFDM symbols of the SS block in the time axis. Various system information called MIB may be transmitted in the PBCH 302, and more specifically, the MIB may include information as shown in Table 2 below, and a PBCH payload and a PBCH demodulation reference signal (DMRS) include the following additional information. For a more detailed description of the MIB in the 5G system, reference may be made to the TS 38.331 standard.

12

System frame number (SFN): 6 bits (systemFrameNumber) in the MIB are used to indicate a part of the SFN. The Least Significant Bit (LSB) 4 bits of the SFN are included in the PBCH payload to be indirectly acquired by the UE through PBCH decoding.

Timing information in a radio frame: The UE may indirectly identify whether the synchronization signal block is transmitted in the 1st or 2nd half frame of the radio frame through 1 bit (half frame) included in the above-described synchronization signal block index and PBCH payload and acquired through PBCH decoding.

12 RBs 305 corresponding to a transmission bandwidth of the PSS 301 and the SSS 303 and 24 RBs 306 corresponding to a transmission bandwidth of the PBCH 302 are different from each other, such that in an 1st OFDM symbol in which the PSS 301 is transmitted within the transmission bandwidth of the PBCH 302, 6 RBs 307 and 6 RBs 308 exist at both sides except for the central 12 RBs in which the PSS 301 is transmitted, and the 6 RBs 307 and the 6 RBs 308 may be used for transmission of another signal or may be empty.

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| spare | BIT STRING (SIZE (1)) |
| } | |

Synchronization signal block information: The offset in the frequency domain of the synchronization signal block is indicated through 4 bits (ssb-SubcarrierOffset) in the MIB. The index of the synchronization signal block including the PBCH may be indirectly acquired through decoding of the PBCH DMRS and PBCH. More specifically, in the frequency band of 6 GHz or less, 3 bits acquired through decoding of the PBCH DMRS may indicate the synchronization signal block index, and in the frequency band of 6 GHz or higher, a total of 6 bits including 3 bits acquired through decoding of the PBCH DMRS and 3 bits included in PBCH payload and acquired through PBCH decoding may indicate the synchronization signal block index including PBCH.

Physical downlink control channel (PDCCH) information: A subcarrier spacing of a common downlink control channel is indicated through 1 bit (subCarrierSpacingCommon) in the MIB, and time-frequency resource configuration information of control resource set (CORESET) and a search space (SS) is indicated through 8 bits (pdcch-ConfigSIB1). The CORESET of the above identifier 0 may be referred to as controlResourceSetZero, and the search space of the identifier 0 may be referred to as searchspaceZero. In the disclosure, the CORESET of identifier 0 is called CORESET #0 or control resource set #0 for convenience, and the search space of identifier 0 is called search space #0 for convenience. During initial access to a cell, the UE may be configured with frequency resources indicating the number of RBs of CORESET #0 including the common search space set of Type0-PDCCH CSS set and time resources indicating the number of OFDM symbols by the pdcch-ConfigSIB1.

All synchronization signal blocks may be transmitted using the same analog beam. That is, the PSS 301, the SSS 303, and the PBCH 302 may all be transmitted through the same beam. The analog beam is not applicable differently in the frequency axis such that the same analog beam is applied in any frequency axis RB in a particular OFDM symbol to which a particular analog beam is applied. Four OFDM symbols in which the PSS 301, the SSS 303, and the PBCH 302 are transmitted may be transmitted through the same analog beam.

Figure 4:
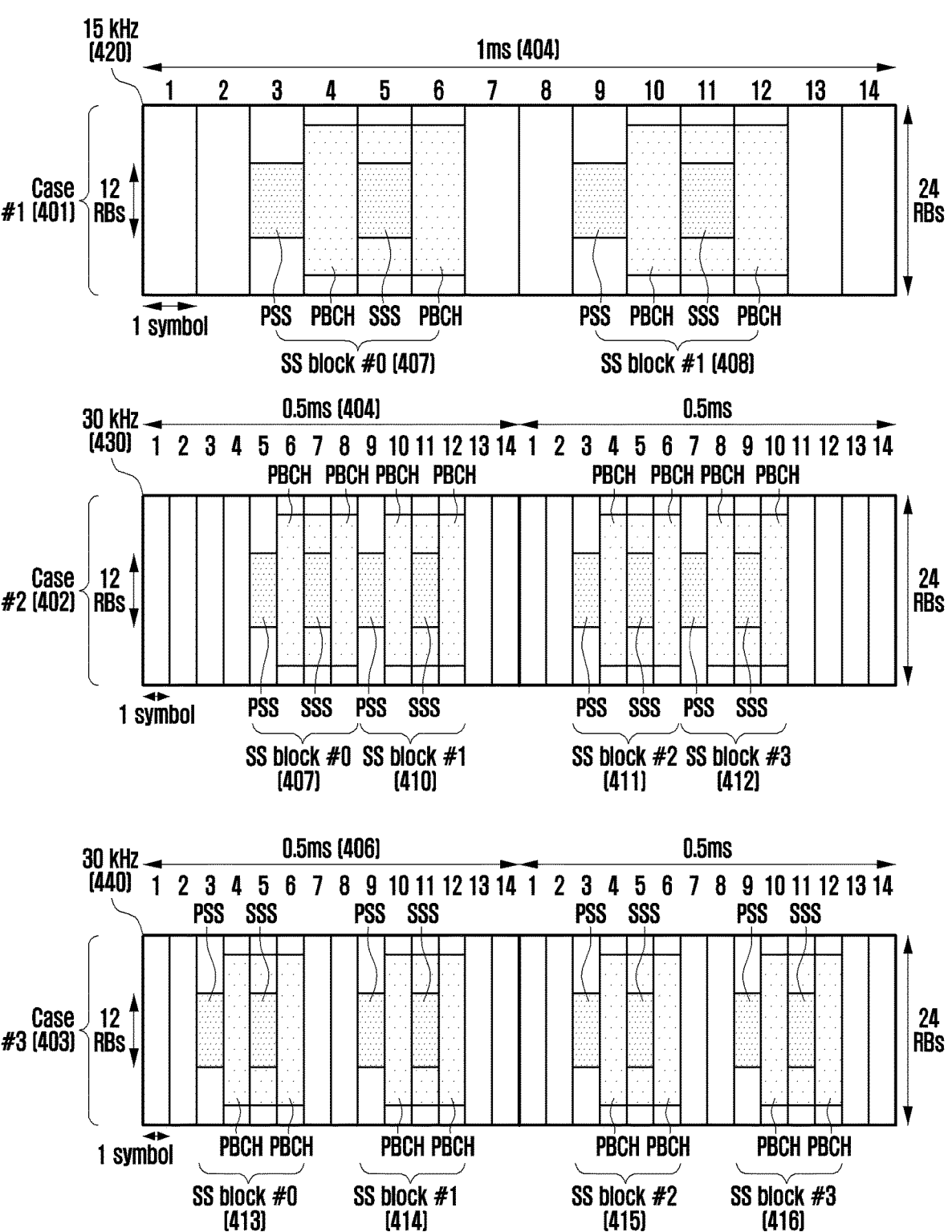
FIG. 4 is a diagram illustrating cases in which a synchronization signal block considered in a wireless communication system is transmitted in a frequency band of 6 GHz or less according to an embodiment of the disclosure.

FIG. 4 is a diagram illustrating various cases in which a synchronization signal block considered in a communication system is transmitted in a frequency band of 6 GHz or less according to an embodiment of the disclosure.

In the 5G communication system, a 15 kHz subcarrier spacing (SCS) 420 and 30 kHz subcarrier spacings 430 and 440 may be used for synchronization signal block transmission in the frequency band of 6 GHz or less. In the 15 kHz subcarrier spacing, one transmission case (case #1 401) of the synchronization signal block may exist, and in the 30 kHz subcarrier spacings, two transmission cases (case #2 402 and case #3 403) of the synchronization signal block may exist.

Referring to FIG. 4, in case #1 401 of the 15 kHz subcarrier spacing 420, a maximum of two synchronization signal blocks may be transmitted within 1 ms 404 (or corresponding to a length of one slot in case that one slot includes 14 OFDM symbols). The example of FIG. 4 shows a synchronization signal block #0 407 and a synchronization signal block #1 408. In an example, the synchronization signal block #0 407 may be mapped to four consecutive symbols starting from a $3^{rd}$ OFDM symbol, and the synchronization signal block #1 408 may be mapped to four consecutive symbols starting from a $9^{th}$ OFDM symbol.

Different analog beams may be applied to the synchronization signal block #0 407 and the synchronization signal block #1 408. In addition, the same beam may be applied to $3^{rd}$ to $6^{th}$ OFDM symbols to which synchronization signal block #0 407 is mapped, and the same beam may be applied to $9^{th}$ to $12^{th}$ OFDM symbols to which synchronization signal block #1 408 is mapped. In the $7^{th}$, $8^{th}$, $13^{th}$, and $14^{th}$ OFDM symbols to which no synchronization signal block is mapped, the analog beam may be freely determined as to which beam to use under the determination of a base station.

Referring to FIG. 4, in case #2 402 of the 30 kHz subcarrier spacing 430, a maximum of two synchronization signal blocks may be transmitted within 0.5 ms 405 (or corresponding to a length of one slot in case that the one slot includes 14 OFDM symbols), and accordingly, a maximum of four synchronization signal blocks may be transmitted within 1 ms (or corresponding a length of two slots in case that one slot includes 14 OFDM symbols). As one example, FIG. 4 shows a case in which the synchronization signal block #0 409, the synchronization signal block #1 410, the synchronization signal block #2 411, and the synchronization signal block #3 412 are transmitted within 1 ms (i.e., two slots). The synchronization signal block #0 409 and the synchronization signal block #1 410 may be mapped from a $5^{th}$ OFDM symbol and a $9^{th}$ OFDM symbol of a $1^{st}$ slot, respectively, and the synchronization signal block #2 411 and synchronization signal block #3 412 may be mapped from a $3^{rd}$ OFDM symbol and a $7^{th}$ OFDM symbol of a $2^{nd}$ slot, respectively.

Different analog beams may be applied to the synchronization signal block #0 409, the synchronization signal block #1 410, the synchronization signal block #2 411, and the synchronization signal block #3 412. In addition, the same analog beam may be applied to each of the $5^{th}$ to the $8^{th}$ OFDM symbols of the $1^{st}$ slot through which synchronization signal block #0 409 is transmitted, the $9^{th}$ to the $12^{th}$ OFDM symbols of the $1^{st}$ slot through which the synchronization signal block #1 410 is transmitted, the $3^{rd}$ to the $6^{th}$ symbols of the $2^{nd}$ slot through which the synchronization signal block #2 411 is transmitted, and the $7^{th}$ to the 10 symbols of the $2^{nd}$ slot through which synchronization signal block #3 412 is transmitted. For the OFDM symbols to which no synchronization signal block is mapped, the analog beam may be freely determined as to which beam to use under the determination of a base station.

Referring to FIG. 4, in case #3 403 of the 30 kHz subcarrier spacing 440, a maximum of two synchronization signal blocks may be transmitted within 0.5 ms 406 (or corresponding to a length of one slot in case that one slot includes 14 OFDM symbols), and accordingly, a maximum of four synchronization signal blocks may be transmitted within 1 ms (or corresponding to a length of two slots in case that one slot includes 14 OFDM symbols). As one example, FIG. 4 shows a case in which the synchronization signal block #0 413, the synchronization signal block #1 414, the synchronization signal block #2 415, and the synchronization signal block #3 416 are transmitted within 1 ms (i.e., two slots). The synchronization signal block #0 413 and the synchronization signal block #1 414 may be mapped from the $3^{rd}$ OFDM symbol and the $9^{th}$ OFDM symbol of the $1^{st}$ slot, respectively, and the synchronization signal block #2 415 and the synchronization signal block #3 416 may be mapped from the $3^{rd}$ OFDM symbol and the $9^{th}$ OFDM symbol of the $2^{nd}$ slot, respectively.

Different analog beams may be used for the synchronization signal block #0 413, the synchronization signal block #1 414, the synchronization signal block #2 415, and the synchronization signal block #3 416. As described in the above examples, the same analog beam may be used in all four OFDM symbols through which the respective synchronization signal blocks are transmitted, and for the OFDM symbols to which no synchronization signal block is mapped, the analog beam may be freely determined as to which beam to use under the determination of a base station.

Figure 5:
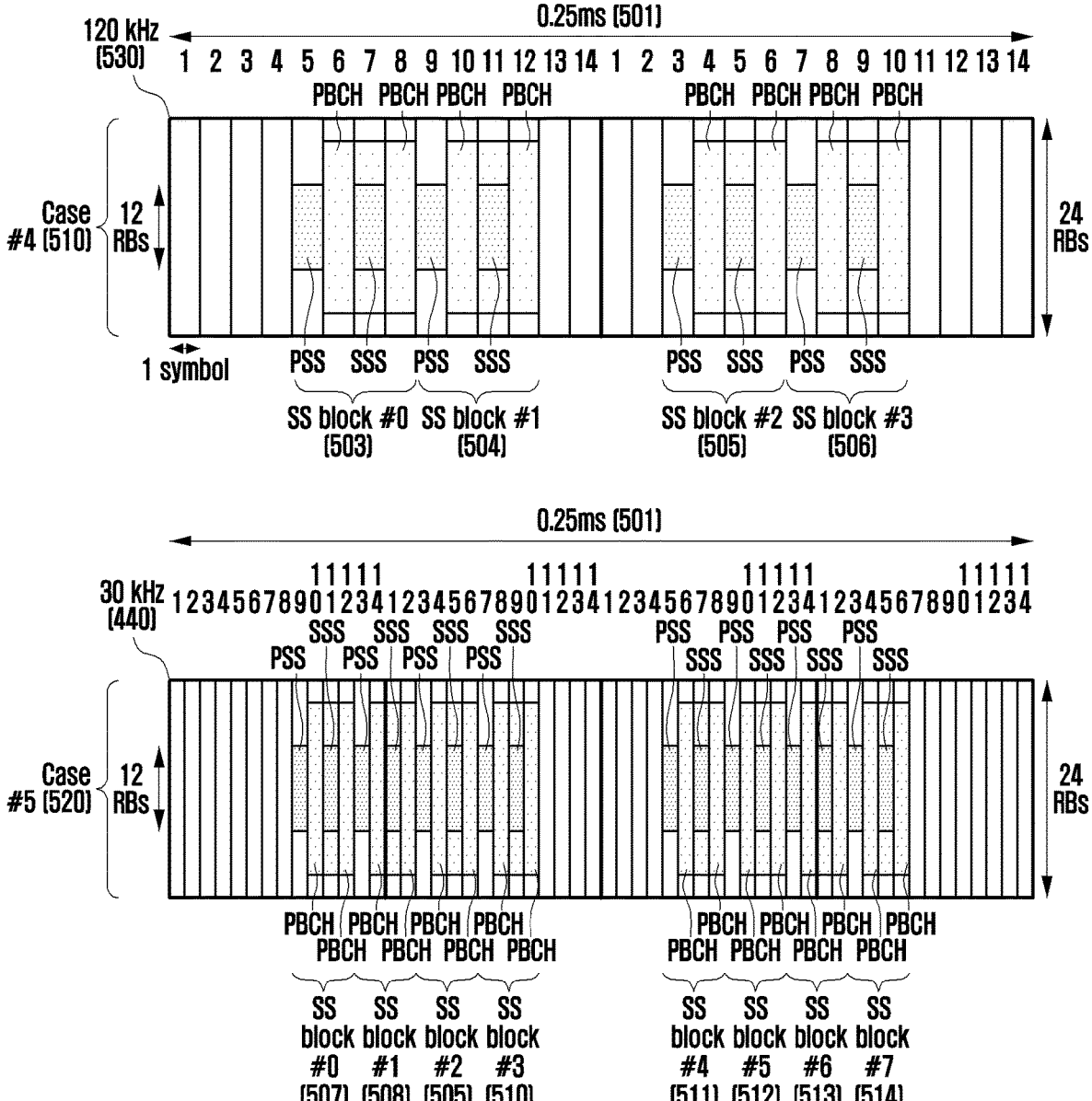
FIG. 5 is a diagram illustrating cases in which a synchronization signal block considered in a wireless communication system is transmitted in a frequency band of 6 GHz or higher according to an embodiment of the disclosure.

FIG. 5 is a diagram illustrating cases in which a synchronization signal block considered in a wireless communication system is transmitted in a frequency band of 6 GHz or higher according to an embodiment of the disclosure.

In the frequency band of 6 GHz or higher in the 5G communication system, 120 kHz subcarrier spacing 530 as in the example of case #4 510 may be used synchronization signal block transmission and 240 kHz subcarrier spacing 540 as in the example of case #5 520 may be used for synchronization signal block transmission.

In case #4 510 of 120 kHz subcarrier spacing 530, a maximum of four synchronization signal blocks may be transmitted within 0.25 ms 501 (or corresponding to a length of two slots in case that one slot includes 14 OFDM symbols).

Referring to FIG. 5, it shows a case in which the synchronization signal block #0 503, the synchronization signal block #1 504, the synchronization signal block #2 505, and the synchronization signal block #3 506 are transmitted within 0.25 ms (i.e., two slots). The synchronization signal block #0 503 may be mapped to four consecutive symbols starting from the 5th OFDM symbol of the 1st slot and the synchronization signal block #1 504 may be mapped to four consecutive symbols starting from the 9th OFDM symbol of the 1st slot. Additionally, the synchronization signal block #2 505 may be mapped to four consecutive symbols starting from the 3rd OFDM symbol of the 2nd slot and the synchronization signal block #3 506 may be mapped to four consecutive symbols starting from the 7th OFDM symbol of the 2nd slot.

As described in the above embodiments, different analog beams may be used in the synchronization signal block #0 503, the synchronization signal block #1 504, the synchronization signal block #2 505, and the synchronization signal block #3 506, respectively. Additionally, the same analog beam may be used in all four OFDM symbols through which the respective synchronization signal blocks are transmitted, and for the OFDM symbols to which no synchronization signal block is mapped, the analog beam may be freely determined as to which beam to use under the determination of a base station.

In case #5 520 of 240 kHz subcarrier spacing 540, a maximum of eight synchronization signal blocks may be transmitted within 0.25 ms 502 (or corresponding to a length of four slots in case that one slot includes 14 OFDM symbols). The example of FIG. 5 shows a case in which the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514 are transmitted within 0.25 ms (i.e., four slots). The synchronization signal block #0 507 may be mapped to four consecutive symbols starting from the 9th OFDM symbol of the 1st slot, the synchronization signal block #1 508 may be mapped to four consecutive symbols starting from the 13th OFDM symbol of the 1st slot, the synchronization signal block #2 509 may be mapped to four consecutive symbols starting from the 3rd OFDM symbol of the 2nd slot, the synchronization signal block #3 510 may be mapped to four consecutive symbols starting from the 7th OFDM symbol of the 2nd slot, the synchronization signal block #4 511 may be mapped to four consecutive symbols starting from the 5th OFDM symbol of the 3rd slot, the synchronization signal block #5 512 may be mapped to four consecutive symbols starting from the 9th OFDM symbol of the 3rd slot, the synchronization signal block #6 513 may be mapped to four consecutive symbols starting from the 13th OFDM symbol of the 3rd slot, and the synchronization signal block #7 514 may be mapped to four consecutive symbols from the 3rd OFDM symbol of the 4th slot.

In the above embodiments, different analog beams may be used for the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514, respectively. Additionally, the same analog beam may be used in all four OFDM symbols through which the respective synchronization signal blocks are transmitted, and for analog beam to be used in the OFDM symbols to which no synchronization signal block is mapped, the analog beam may be freely determined as to which beam to use under the determination of a base station.

Figure 6:
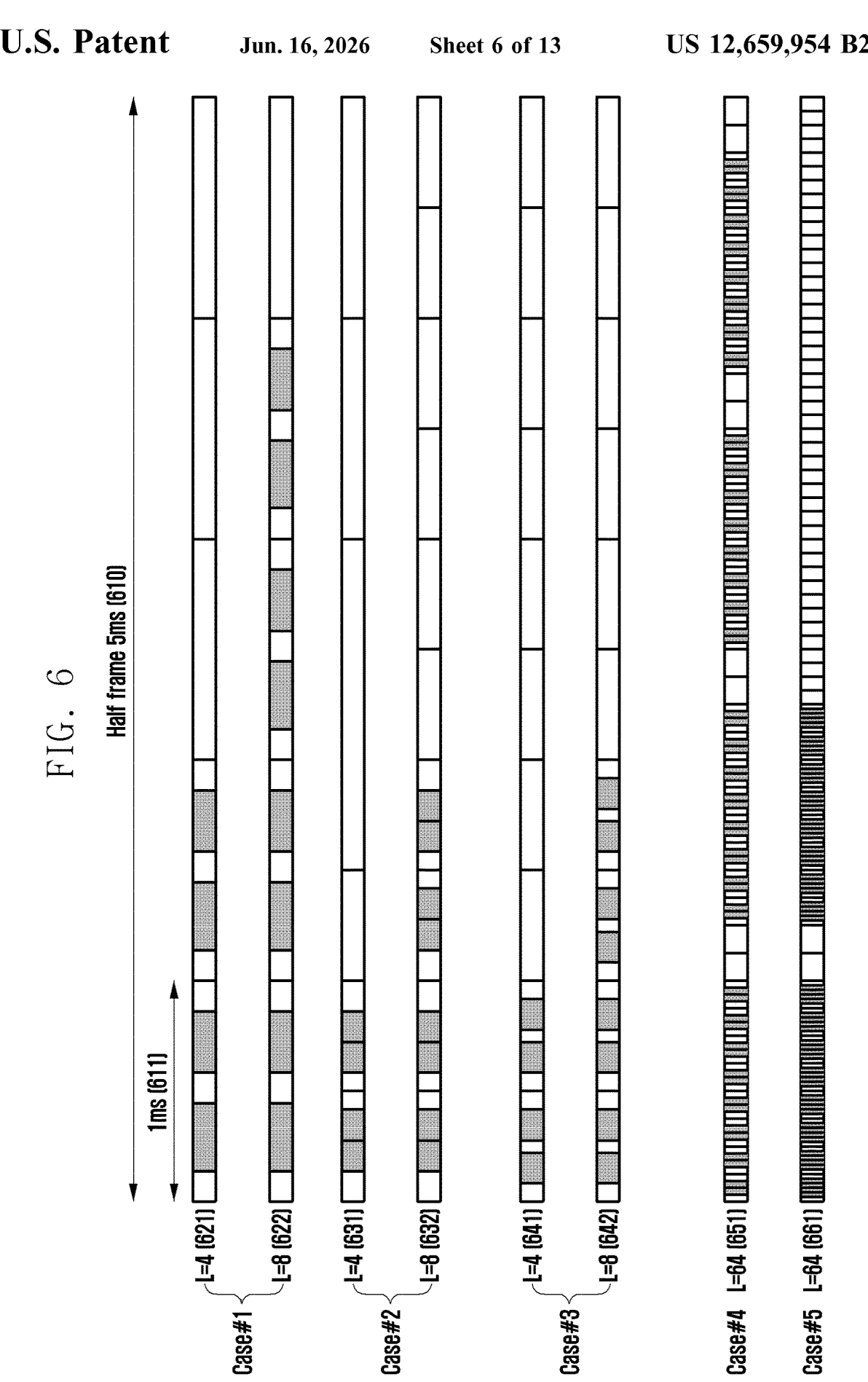
FIG. 6 is a diagram illustrating cases in which a synchronization signal block according to a subcarrier spacing is transmitted within 5 ms in a wireless communication system according to an embodiment of the disclosure.

FIG. 6 is a diagram illustrating cases in which a synchronization signal block according to a subcarrier spacing is transmitted within 5 ms in a wireless communication system according to an embodiment of the disclosure.

In the 5G communication system, a synchronization signal block may be periodically transmitted in units of 5 ms (corresponding to five subframes or half frame 610).

In a frequency band of 3 GHz or less, a maximum of four synchronization signal blocks may be transmitted within 5 ms half frame 610. A maximum of eight synchronization signal blocks may be transmitted in a frequency band higher than 3 GHz and less than or equal to 6 GHz. A maximum of sixty four synchronization signal blocks may be transmitted in the frequency band of higher than 6 GHz. As described above, the 15 kHz subcarrier spacing and the 30 kHz subcarrier spacing may be used at frequencies of 6 GHz or less.

Referring to FIG. 6, in case #1 401 of the 15 kHz subcarrier spacing including one slot of FIG. 4, the synchronization signal block may be mapped to the 1st slot and the 2nd slot in a frequency band of 3 GHz or less, and accordingly, a maximum of four synchronization signal blocks 621 may be transmitted. In addition, the synchronization signal block may be mapped to the 1st, 2nd, 3rd, and 4th slots in a frequency band greater than 3 GHz and less than or equal to 6 GHz, and accordingly, a maximum of eight synchronization signal blocks 622 may be transmitted. In case #2 402 or case #3 403 of the 30 kHz subcarrier spacing including two slots of FIG. 4, the synchronization signal block may be mapped starting from the 1st slot in a frequency band of 3 GHz or less, and accordingly, a maximum of four synchronization signal blocks 631 and 641 may be transmitted. In addition, the synchronization signal block may be mapped starting from the 1st and 3rd slots in a frequency band greater than 3 GHz and less than or equal to 6 GHz, and accordingly, a maximum of eight synchronization signal blocks 632 and 642 may be transmitted.

The 120 kHz subcarrier spacing and the 240 kHz subcarrier spacing may be used at frequencies higher than 6 GHz. In the example in FIG. 6, in case #4 510 of the 120 kHz subcarrier spacing including two slots of FIG. 5, the synchronization signal block may be mapped starting from the 1st, 3rd, 5th, 7th, 11th, 13th, 15th, 17th, 21st, 23rd, 25th, 27th, 31st, 33rd, 35th, and 37th slots in a frequency band higher than 6 GHz, and accordingly, a maximum of sixty four synchronization signal blocks 651 may be transmitted. In the example in FIG. 6, in case #5 520 of the 240 kHz subcarrier spacing including four slots of FIG. 5, the synchronization signal block may be mapped starting from the 1st, 5th, 9th, 13th, 21st, 25th, 29th, and 33rd slots in a frequency band higher than 6 GHz, and accordingly, a maximum of sixty four synchronization signal blocks 661 may be transmitted.

The UE may decode a PDCCH and a PDSCH, based on system information included in the received MIB and then acquire an SIB. The SIB may include at least one of an uplink cell bandwidth, a random access parameter, a paging parameter, a parameter related to uplink power control, etc.

In 3GPP, standard on a reduced-capability (RedCap) UE operating based on NR has been completed. In order to further reduce the capability of the terminal, discussions are underway on an enhanced reduced-capability UE. In order to further reduce the capability of the UE, schemes such as reducing the RF bandwidth from 20 MHz to 5 MHz or reducing the baseband bandwidth from 20 MHz to 5 MHz are being considered. In particular, in the disclosure, a scheme in which the RF bandwidth is set to 20 MHz, the remaining channels/signals, etc. except for downlink/uplink data maintain the baseband bandwidth of 20 MHz, and the baseband bandwidth for transmitting and receiving downlink/uplink data is reduced to a specific value (hereinafter, in the disclosure, for convenience of explanation, the case where the specific value is 5 MHz is given as an example, but the disclosure is not limited thereto) is considered.

An initial cell access process for the enhanced reduced-capability UE to access a cell (or a base station) will be described. In an embodiment, the enhanced reduced-capability UE may acquire cell synchronization by receiving a synchronization signal block in the initial cell access for accessing a cell (or a base station) as shown in the embodiment of FIG. 4 or 5 and then determine whether the cell supports the enhanced reduced-capability UE through MIB acquisition or SIB acquisition or a random access process. Additionally, in case that the cell is determined to support the enhanced reduced-capability UE, the enhanced reduced-capability UE may transmit at least one piece of capability information on the bandwidth size of RF or baseband supported in the cell by the enhanced reduced-capability UE, whether full-duplex communication or half-duplex communication is supported, the number of transmitting or receiving antennas being provided (or supported), whether the enhanced reduced-capability UE supports the case where the UE dedicated BWP configured by a higher layer signal includes control resource set #0 and a synchronization signal block, or whether the enhanced reduced-capability UE supports the case where the UE dedicated BWP configured by the higher layer signal does not include control resource set #0 and a synchronization signal block such that the base station can know that the UE attempting to access is the enhanced reduced-capability UE. Alternatively, in case that half-duplex communication support is essential for the enhanced reduced-capability UE, information on whether half-duplex communication is supported may be omitted from the capability information.

The base station may configure separate random access resources for each of a reduced-capability UE or an enhanced reduced-capability UE, and transmit the configuration information on the random access resource to the enhanced reduced-capability UE through system information. In another embodiment, the system information for transmitting information on the random access resource may be system information transmitted separately from system information for a UE supporting a different standard within a cell, and the base station may configure separate random access resources for the UE supporting a different standard and the enhanced reduced-capability UE, thereby distinguishing whether the UE supporting a different standard performs random access or the enhanced reduced-capability UE performs random access. In yet another embodiment, the base station may configure a common random access resource for all UEs in a cell without configuring a separate random access resource for the enhanced reduced-capability UE. The configuration information for the random access resource may be transmitted to all UEs in the cell through system information, and the UE having received the system information may perform random access at the random access resource.

The UE may complete the random access process to proceed to the RRC connection mode for performing transmission and reception of data with the cell.

A UE may form a radio link with a network through a random access procedure, based on system information and synchronization with the network obtained in the cell search process of the cell. A contention-based or contention-free scheme may be used for random access. In case that the UE performs cell selection and reselection in an initial access phase of the cell, for example, contention-based random access scheme may be used for the purpose of state transition from the RRC_IDLE (RRC idle) state to the RRC_CONNECTED (RRC connection) state. Contention-free random access may be used in the case of arrival of downlink data, in the case of handover, or in the case of re-establishing uplink synchronization in the case of location measurement.

Table 3 below exemplifies the conditions (events) under which the random access procedure is triggered in the 5G system. For a detailed description, reference may be made to TS 38.300.

TABLE 3

| |
| --- |
| -     Initial access from RRC_IDLE; |
| -     RRC Connection Re-establishment procedure; |
| -     DL or UL data arrival during RRC_CONNECTED when UL synchronisation status is "non-synchronised"; |
| -     UL data arrival during RRC_CONNECTED when there are no PUCCH resources for SR available; |
| -     SR failure; |
| -     Request by RRC upon synchronous reconfiguration (e.g. handover); |
| -     Transition from RRC_INACTIVE; |
| -     To establish time alignment for a secondary TAG; |
| -     Request for Other SI (see clause 7.3); |
| -     Beam failure recovery; |

Next, bandwidth part (BWP) configuration in a 5G communication system will be described in detail with reference to the drawings.

In the 5G communication system, the base station may configure one or a plurality of BWPs to the UE, and may configure the information included in Table 4 below for each BWP.

TABLE 4

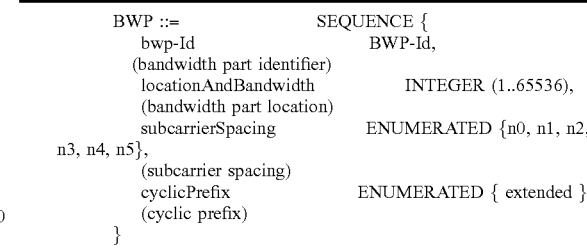

| BWP ::= | SEQUENCE { |
| --- | --- |
|    bwp-Id | BWP-Id, |
|    (bandwidth part identifier) | |
|    locationAndBandwidth | INTEGER (1..65536), |
|    (bandwidth part location) | |
|    subcarrierSpacing | ENUMERATED {n0, n1, n2, n3, n4, n5}, |
|    (subcarrier spacing) | |
|    cyclicPrefix | ENUMERATED { extended } |
|    (cyclic prefix) | |
| } | |

In addition to the above configuration information, various parameters related to the BWP may be configured for the UE. The information may be transmitted, from the base station, to the UE, through higher layer signaling, e.g., RRC signaling. At least one BWP among one or a plurality of BWPs may be activated. Whether or not the configured BWP is activated may be semi-statically transmitted from the base station to the UE through RRC signaling or dynamically transmitted through DCI.

The UE, before the RRC connection, may receive an initial BWP for initial access, from the base station, through a mater information block (MIB) or system information block 1 (SIB 1).

The configurations for control resource set #0, search space #0, and an initial BWP are described in detail. In an embodiment, the UE may receive configuration information about control resource set #0 and search space #0 through which a PDCCH for reception of system information (that may correspond to remaining system information (RMSI) or system information block (SIB 1)) for initial access through the MIB in the initial access stage. The control resource set and the search space configured using the MIB may be regarded as identity (ID) 0, respectively. In another embodiment, the base station may notify the UE of configuration information, such as frequency allocation information, time allocation information, and numerology for control resource set #0 through the MIB. In addition, the base station may notify the UE of configuration information related to a monitoring period and an occasion for control resource set #0, i.e., configuration information about search space #0, through the MIB.

In a method for configuring the initial BWP, UEs that have not yet been RRC-connected may receive configuration information about an initial BWP through an MIB in an initial access stage. More specifically, a UE may receive, from the MIB of a physical broadcast channel (PBCH), a configuration of a control resource set (CORESET) for a DL control channel through which downlink control information (DCI) for scheduling a system information block (SIB) is able to be transmitted. In yet another embodiment, the bandwidth of the control resource set configured through the MIB may be regarded as an initial BWP, and the UE may receive a PDSCH through which an SIB is transmitted through the configured initial BWP. The initial BWP may be used for other system information (OSI), paging, and random access, in addition to the reception of an SIB.

In case of a reduced-capability UE, standardization for complexity-reducing schemes such as reducing the RF bandwidth (from 100 MHz to 20 MHz for FR1, and from 200 MHz to 100 MHz for FR2), and reducing the number of reception antennas from 4 or 2 to 1 or from 2 to 1 has been completed to reduce the complexity of the UE.

In an example of an enhanced reduced-capability UE, schemes such as reducing the RF bandwidth from 20 MHz to 5 MHz or reducing the baseband bandwidth from 20 MHz to 5 MHz are being considered to further reduce the complexity of the UE. In particular, in the disclosure, a scheme in which the RF bandwidth is set to 20 MHz, the remaining channels/signals except for downlink/uplink data maintain a baseband bandwidth of 20 MHz, and the baseband bandwidth for transmitting and receiving downlink/uplink data is reduced to a specific value (hereinafter, in the disclosure, for convenience of description, a case where the specific value is 5 MHz is given as an example, but the disclosure is not limited thereto) is considered. In case where an enhanced reduced-capability UE, a legacy reduced-capability UE, normal UEs coexist within one base station, it provides a method and apparatus for supporting SIB1 only for the enhanced reduced-capability UE, which is different legacy reduced-capability UE and normal UEs. Additionally, in a situation where the enhanced reduced-capability UE is provided with only a post-FFT buffer corresponding to 5 MHz due to a baseband for transmitting and receiving downlink/uplink data of 5 MHz, the resource allocation of the uplink and downlink data channels cannot be known before decoding the downlink control channel. Thus, there is a problem that all received signals corresponding to 20 MHz cannot be stored. Accordingly, a method and apparatus are provided for the enhanced reduced-capability UE to receive an indication for resource allocation of uplink and downlink data channels corresponding to 5 MHz and to receive uplink and downlink data channels of 5 MHz.

Figure 7:
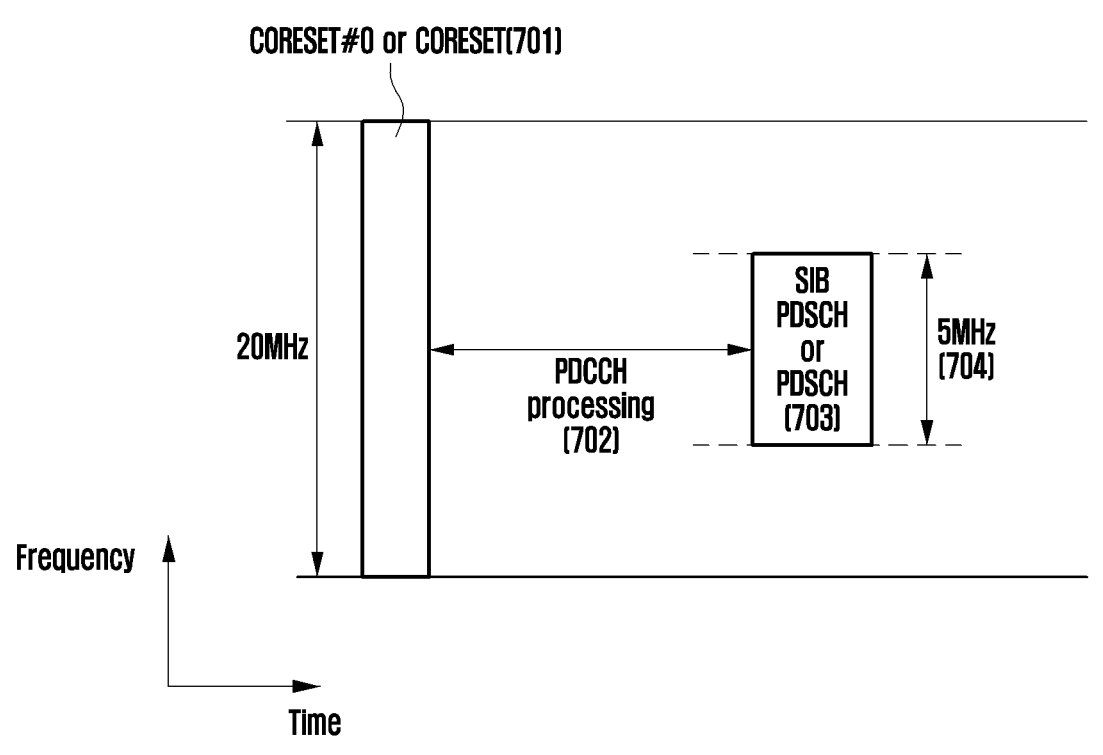
FIG. 7 is a diagram illustrating receiving a control channel through control resource set #0 or control resource set and receiving related downlink data by an enhanced reduced-capability UE according to an embodiment of the disclosure.
Figure 7:
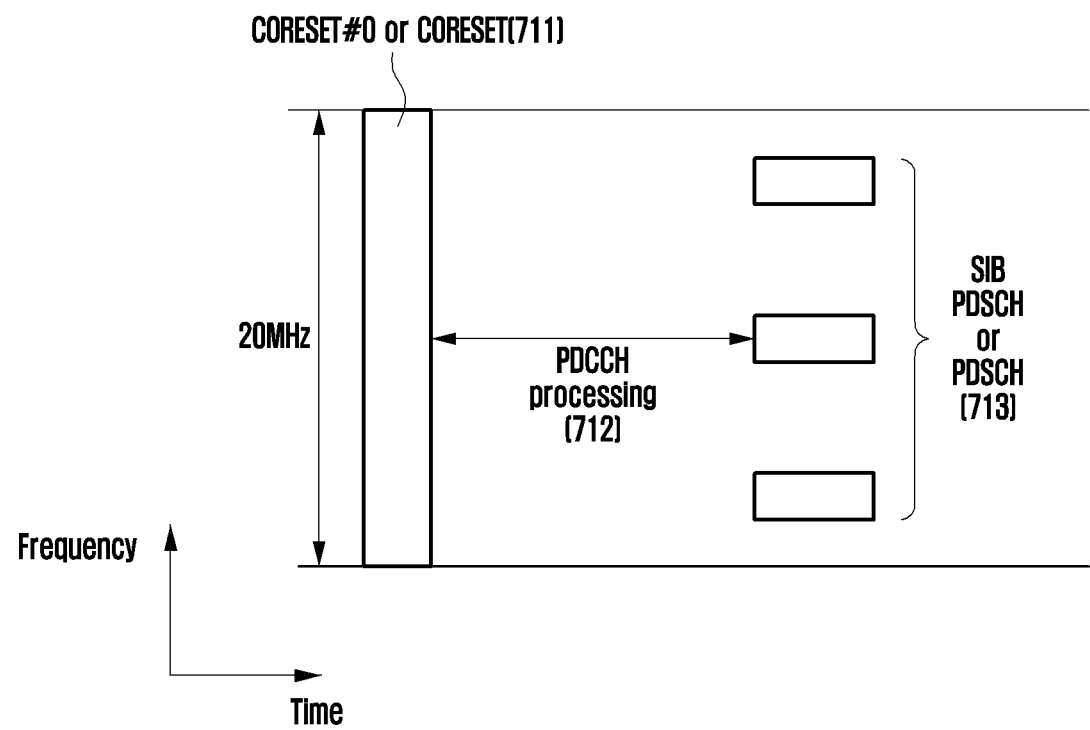

FIG. 7 is a diagram illustrating receiving a control channel through control resource set #0 or control resource set and receiving related downlink data for an enhanced reduced-capability UE according to an embodiment of the disclosure.

Referring to FIG. 7, a scheme in which an enhanced reduced-capability UE receives an indication for resource allocation of uplink and downlink data channels corresponding to 5 MHz and receives uplink and downlink data channels of 5 MHz will be described.

Referring to FIG. 3, normal UE, a reduced-capability, or an enhanced reduced-capability UE may receive PSS, SSS, and PBCH from a synchronization signal block. In an embodiment, the UE may acquire, through pdcch-ConfigSIB1 in MIB in the PBCH, multiplexing pattern information between the synchronization signal block and control resource set #0 701, the number of RBs in the frequency domain of control resource set #0 701 and the number of symbols in the time domain, offset information between a frequency-domain start location of the control resource set #0 701 and a frequency-domain start location of the synchronization signal block, and the slot and symbol location in the time domain of control resource set #0 701.

In an example, the normal UE, reduced-capability UE, or enhanced reduced-capability UE may determine one index value among the index values between 0 and 15, as shown in Table 5 below, through 4 bits of pdcch-ConfigSIB1, and may acquire part of the pieces of information corresponding to the determined index value, i.e., multiplexing pattern information between the synchronization signal block and control resource set #0 701, the number of RBs in the frequency domain of control resource set #0 701 and the number of symbols in the time domain, and offset information between a frequency-domain start location of the control resource set #0 701 and a frequency-domain start location of the synchronization signal block. In addition, the normal UE, reduced-capability UE, or enhanced reduced-capability UE may determine one index value among the index values between 0 and 15, as shown in Table 6 below, through another 4 bits of pdcch-ConfigSIB1, and may acquire part of the pieces of information corresponding to the determined index value, i.e., the slot and symbol location in the time domain of control resource set #0 701.

Tables 5 and 6 below show only one example, and other tables for mapping the same information may exist. In another example, similar to Table 5, several tables may be defined to indicate, using a specific number of bits, multiplexing pattern information between the synchronization signal block and control resource set #0, the number of RBs in the frequency domain of control resource set #0 and the number of symbols in the time domain, and offset information between a frequency-domain start location of control resource set #0 and a frequency-domain start location of the synchronization signal block together. Which table among the plurality of tables above will be selected by the enhanced reduced-capability UE may be determined by information on the frequency band operating based on at least one of the subcarrier spacing (SCS) of the synchronization signal block, the SCS of a control channel, a minimum channel bandwidth of a frequency band, and shared spectrum channel access. In addition, similar to Table 6, a plurality of tables may be defined to indicate the slots and symbol location in the time domain of control resource set #0, using a specific number of bits. Which table among the plurality of tables above will be selected by the enhanced reduced-capability UE may be determined by information of a frequency band operating based on at least one of the subcarrier spacing (SCS) of the synchronization signal block, the SCS of a control channel, a minimum channel bandwidth of a frequency band, and shared spectrum channel access.

TABLE 5

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

TABLE 6

| Index | 0 | Number of search space sets per slot | M | First symbol index |
|---|---|---|---|---|
| 0 | 0 | 1 | 1 | 0 |
| 1 | 0 | 2 | ½ | {0, if I is even}, {$N_{symb}^{CORESET}$, if i is odd} |
| 2 | 2 | 1 | 1 | 0 |
| 3 | 2 | 2 | ½ | {0, if i is even}, {$N_{symb}^{CORESET}$, if i is odd} |
| 4 | 5 | 1 | 1 | 0 |
| 5 | 5 | 2 | ½ | {0, if i is even}, {$N_{symb}^{CORESET}$, if i is odd} |

TABLE 6-continued

| Index | 0 | Number of search space sets per slot | M | First symbol index |
|---|---|---|---|---|
| 6 | 7 | 1 | 1 | 0 |
| 7 | 7 | 2 | ½ | $\{0,$ if i is even$\}$, $\{N_{symb}^{CORESET},$ if i is odd$\}$ |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

The normal UE, reduced-capability UE, or enhanced reduced-capability UE may determine the time-frequency location of control resource set #0 701 through acquisition of the above information.

In case where a configuration of the initial BWP is not provided to the normal UE, reduced-capability UE, or enhanced reduced-capability UE through initialDownlinkBWP in SIB1, the initial BWP may be defined as having the same frequency resource as the frequency resource according to the frequency domain of the control resource set #0 701, i.e., the location and number of consecutive PRBs starting from the PRB of the lowest value and ending with the PRB of the highest value of the control resource set #0 701.

The initial BWP may be common initial BWP or common control resource set #0 applicable to all UEs in a cell, i.e., the normal UEs, reduced-capability UEs, or enhanced reduced-capability UEs. However, since the enhanced reduced-capability UE may have smaller number of reception antennas than that of the normal UE, many downlink resources may be required in an initial BWP or in control resource set #0 to provide downlink coverage similar to that of the normal UE. In this case, a dedicated initial BWP and/or a dedicated control resource set #0 may be configured upon initial connection of multiple enhanced reduced-capability UEs while minimizing the impact on downlink resources within the initial bandwidth required for data transmission/reception to/from the normal UE.

A scheme for configuring a SIB1 or a new SIB1 dedicated to an enhanced reduced-capability UE to the enhanced reduced-capability UE will be described below.

It is possible to use a spare 1 bit, which is the last bit in the MIB in the PBCH, to determine whether a SIB1 dedicated to the enhanced reduced-capability UE exists. For example, the base station uses the spare 1 bit to indicate the existence of SIB1 dedicated to the enhanced reduced-capability UE by 1 bit, e.g., ENUMERATED {existed, notExisted} in the MIB, and the enhanced reduced-capability UE receives the value in the spare 1 bit, so that whether the SIB1 dedicated to the enhanced reduced-capability UE exists may be determined.

A scheme for an enhanced reduced-capability UE to receive the SIB1 dedicated to the UE will be described.

In an embodiment, upon initial access of the enhanced reduced-capability UE, the base station may transmit a PDCCH scheduling the SIB1 dedicated to the enhanced reduced-capability UE in a common initial BWP and common control resource set #0. The SIB1 dedicated to the enhanced reduced-capability UE may always be limited to have resource allocation within A MHz (e.g., A=5).

In the common control resource set #0, there may be a PDCCH that schedules a common SIB1 received by not only normal UEs but also reduced-capability UEs. Therefore, different RNTIs may be used to distinguish between the PDCCH and a PDCCH scheduling the SIB1 dedicated to the enhanced reduced-capability UE. The PDCCH scheduling a common SIB1 may be scrambled with SI-RNTI, but the RNTI for scrambling the PDCCH scheduling the SIB1 dedicated to the enhanced reduced-capability UE may be a new SI-RNTI that is distinct from the SI-RNTI. For the sake of convenience in the disclosure, the new SI-RNTI is a term referring to a SI-RNTI that is applied to the PDCCH scheduling the SIB dedicated to the enhanced reduced-capability UE, and may be newly defined in the standard to mean an RNTI applied to the enhanced reduced-capability such as eRedCap_SI-RNTI. In a situation where the enhanced reduced-capability UE has only a post-FFT buffer corresponding to A MHz due to the baseband for transmitting and receiving downlink/uplink data of A MHz, the enhanced reduced-capability UE cannot know the resource allocation of the uplink and downlink data channels before decoding the downlink control channel. Therefore, there is a problem that all received signals corresponding to B MHz (e.g., B=20) cannot be buffered. A scheme for the enhanced reduced-capability UE to receive an indication for resource allocation of uplink and downlink data channels corresponding to A MHz and receive uplink and downlink data channels of A MHz will be described.

In the following, the description is given for the control resource set #0, the SIB1 PDSCH, and the PDCCH scheduling the SIB1 PDSCH, but it may also be applied to a normal control resource set, a normal PDSCH, and a normal PDCCH scheduling the normal PDSCH. Additionally, the resource area in which the SIB1 PDSCH corresponding to the maximum A Mhz is transmitted may be consecutive PRBs 704 or non-consecutive PRBs 713.

Referring to FIG. 7, the enhanced reduced-capability UE may receive a PDCCH scheduling a SIB1 dedicated to the enhanced reduced-capability UE or common SIB1 in control resource set #0 701 or 711 of B Mhz. The enhanced reduced-capability UE cannot know where A Mhz the SIB1 PDSCH 703 or 713 is transmitted on before decoding the PDCCH, and with the UE has a buffer that can only receive data corresponding to A MHz. A scheme for receiving the SIB1 PDSCH in the buffer corresponding to the A MHz is provided.

As a first scheme, the enhanced reduced-capability UE may expect that the SIB1 PDSCH or the first symbol of SIB1 PDSCH is scheduled after X symbol, X slot, or X [Tc], based on the last symbol of the PDCCH scheduling the SIB1 PDSCH. The enhanced reduced-capability UE may not expect that the SIB1 PDSCH or the first symbol of the SIB1 PDSCH is scheduled before X symbol, X slot, or X [Tc], based on the last symbol of the PDCCH scheduling the SIB1 PDSCH. The enhanced reduced-capability UE does not need to buffer the signal of Y Mhz. The X may be a predefined value, or may be defined in the form of a table of specific values, or may be preconfigured in a higher layer signal (e.g., SIB, RRC, or MAC CE) and which value to be selected may be indicated through PDCCH or another higher layer signal (e.g., SIB, RRC, or MAC CE).

As a second scheme, the enhanced reduced-capability UE may report the capability related to the PDCCH decoding processing time 702 or 712 through a higher layer signal to the base station, and the base station may schedule the SIB1 PDSCH after the PDCCH decoding processing time 702 or 712 in consideration of the PDCCH decoding processing time 702 or 712. The enhanced reduced-capability UE may decode the PDCCH within the PDCCH decoding processing time 702 or 712 and buffer the SIB1 PDSCH corresponding to A Mhz. The enhanced reduced-capability UE may expect to receive the SIB1 PDSCH after the PDCCH decoding processing time 702 or 712. Alternatively, the enhanced reduced-capability UE may not expect to receive the SIB1 PDSCH before the PDCCH decoding processing time 702 or 712.

As a third scheme, it may be indicated in advance in which A Mhz resource area the SIB1 PDSCH may be transmitted. The indication may be performed through the PDCCH as in the first and second schemes above, and as another method, the indication may be preconfigured to the enhanced reduced-capability UE through a higher layer signal.

The common initial BWP, dedicated initial BWP, or normal initial BWP of the enhanced reduced-capability UE through which the SIB1 PDSCH may be transmitted may be divided into sub-bands within A Mhz. The sub-band may mean the minimum unit of the resource area in which the SIB1 PDSCH may be indicated to be transmitted. The size of the sub-band may vary depending on subcarrier spacing (SCS). In an example, in the case of 15 kHz, the sub-band size may be 25RB, and in the case of 30 kHz, the sub-band size may be 11RB.

Through FIG. 8, the BWPs are divided into each sub-band and a scheme of indicating the enhanced reduced-capability UE on which sub-band the SIB1 PDSCH may be transmitted will be described.

Figure 8:
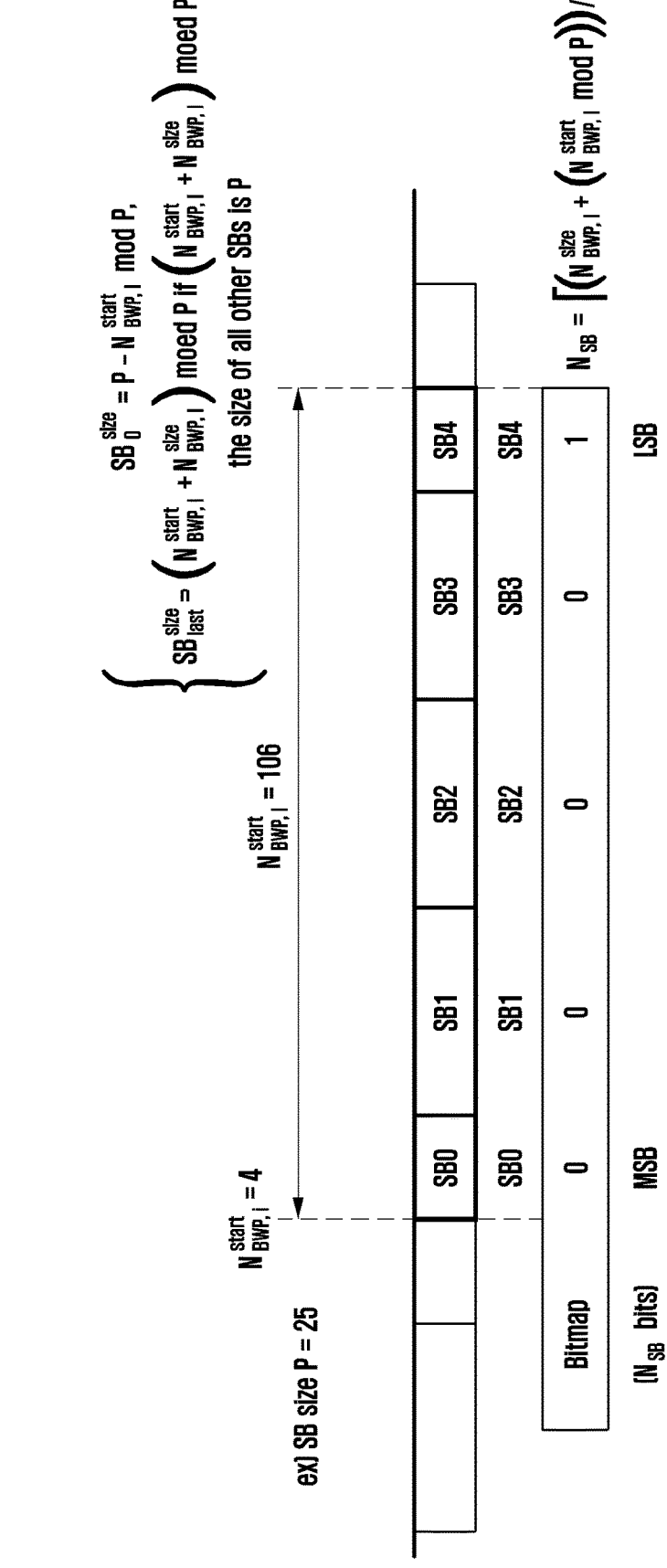
FIG. 8 is a diagram illustrating a method for indicating a 5 MHz resource area for an enhanced reduced-capability UE in a wireless communication system according to an embodiment of the disclosure.

FIG. 8 is a diagram illustrating a method for indicating an A Mhz resource area for an enhanced reduced-capability UE in a wireless communication system according to an embodiment of the disclosure.

Referring to FIG. 8, a BWP may be assumed to be 106RB, SCS may be 15 kHz, and a sub-band size P may be 25RB. The above BWP of 106RB may include a total of 5 sub-bands (which may be calculated from N_SB). Sub-band 0 (SB0) starts from 4, the starting PRB of the BWP, and includes a total of 21RB (which may be calculated from $$SB_0^{size}).$$

SB1, SB2, and SB3 include 25RB (the sizes of all other SBs may be calculated from P). Lastly, SB4 includes a total of 10 RB (which may be calculated from $$SB_{last}^{size}).$$

Through the above sub-band constitution, which sub-band may be selected and transmit the SIB1 PDSCH may be indicated by N bits (in FIG. 8, with 3 bits, SB0 may be indicated as 000, SB1 as 001, SB2 as 010, SB3 as 011, and SB4 as 100). Alternatively, as shown in FIG. 8, one or more sub-bands including a 5-bit bitmap through which the SIB1 PDSCH may be transmitted may be indicated.

In another embodiment, the enhanced reduced-capability UE may not expect to receive another PDCCH before decoding the PDCCH and receiving the SIB1 PDSCH. Alternatively, the enhanced reduced-capability UE may not expect to receive another PDCCH before decoding the last symbol of the PDCCH and receiving the first symbol of the SIB1 PDSCH.

Figure 9:
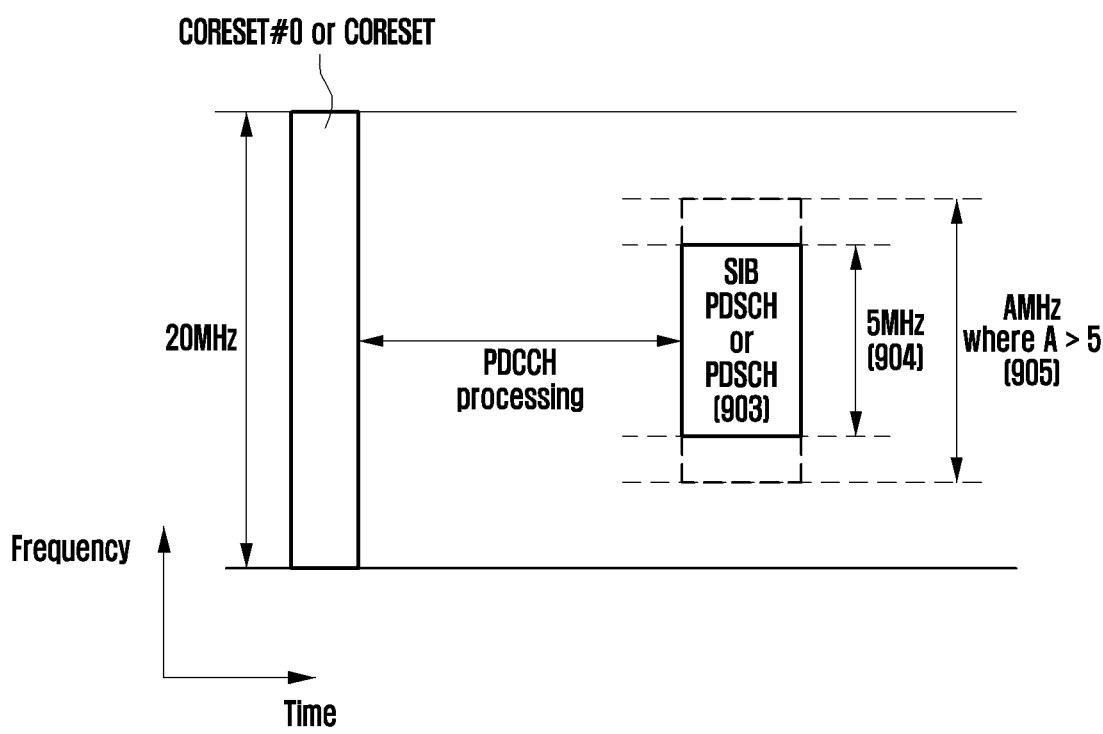
FIG. 9 is a diagram illustrating that an enhanced reduced-capability UE receives a control channel through control resource set #0 or control resource set and transmits related uplink data according to an embodiment of the disclosure.

FIG. 9 is a diagram illustrating that an enhanced reduced-capability UE receives a control channel through control resource set #0 or control resource set and transmits related uplink data according to an embodiment of the disclosure.

Referring to FIG. 9, in a situation where the enhanced reduced-capability UE has only a buffer corresponding to A Mhz due to the baseband for uplink data transmission limited to a maximum of A Mhz, and if the base station cannot know whether the uplink data channel corresponding to Msg3 is for the enhanced reduced-capability UE the resource allocation of Msg3 may be greater than A Mhz. In an example, when the base station disables the operation that PRACH transmission contains information that the enhanced reduced-capability UE is performing random access, the base station does not know whether the enhanced reduced-capability UE performs PRACH transmission or another UE performs PRACH transmission. In this case, there is a problem that where the enhanced reduced-capability UE transmits the Msg3 uplink data channel of A Mhz Additionally, even though the base station has scheduled resources larger than A Mhz, it is not clear how the base station, which does not know the resource on which the uplink data corresponding to the A Mhz is actually transmitted by the enhanced reduced-capability UE, can properly receive the uplink data. A scheme for solving the above problems will be described. In FIG. 9, Msg3 is mainly described, but the scheme may be also applicable to general PUSCH.

In a first scheme, in a case where the uplink data resource allocation 905 of Msg3 scheduled by the base station is greater than A Mhz 904, the enhanced reduced-capability UE may map Msg3 903 of A Mhz from the first RB (lowest RB) of the uplink data resource allocation 905 of Msg3 scheduled by the base station and transmit the same.

In a second scheme, in a case where the uplink data resource allocation 905 of Msg3 scheduled by the base station is greater than A Mhz 904, information on which RB the enhanced reduced-capability UE will start mapping Msg3 is predetermined and the UE may determine the mapping resource of Msg3 from the information. Alternatively, which RB the enhanced reduced-capability UE will start mapping Msg3 may be indicated by a higher layer signal and/or a physical signal. The physical signal may be a PDCCH for scheduling Msg3 or another PDCCH.

Figure 10:
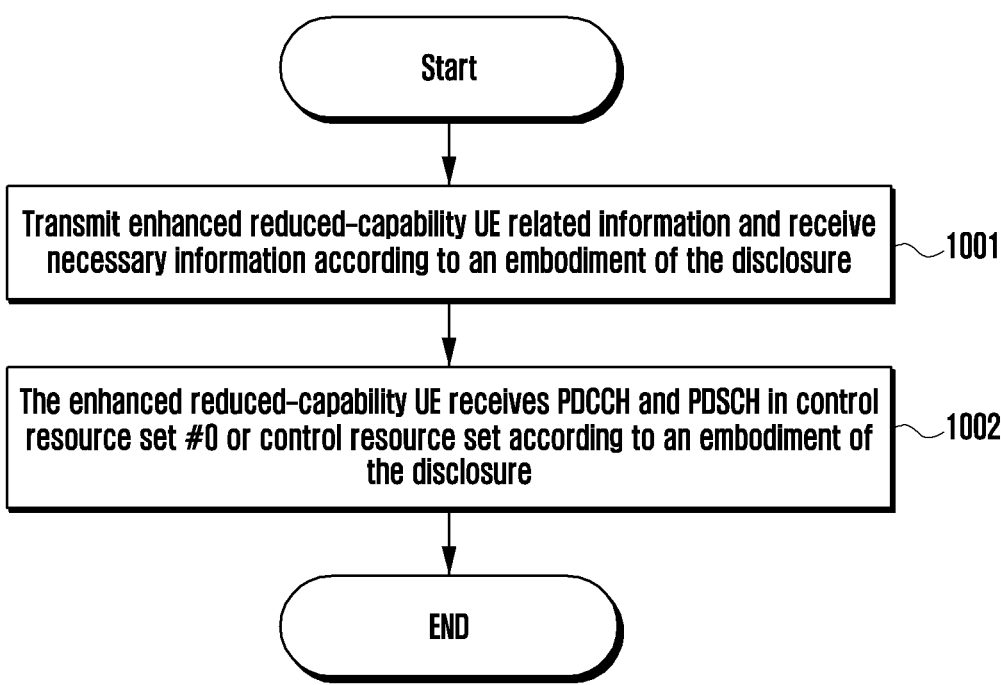
FIG. 10 is a flowchart illustrating a procedure of a UE in a wireless communication system according to an embodiment of the disclosure.

FIG. 10 is a flowchart illustrating a procedure of an enhanced reduced-capability UE in a wireless communication system according to an embodiment of the disclosure.

Referring to FIG. 10, in operation 1001, the enhanced reduced-capability UE may receive, from the base station, at least one piece of configuration information including information required to receive a common initial BWP and control resource set #0, an initial BWP and control resource set #0 dedicated to the enhanced reduced-capability UE, remaining normal BWPs excluding the initial BWPs, and remaining normal control resource sets excluding the control resource set #0, information for random access in the enhanced reduced-capability UE, TDD or FDD cell information, resource information on a configuration-based downlink signal or a configuration-based uplink signal, and full-duplex or half-duplex communication configuration information. In an embodiment, the configuration information may be provided to the UE through SIB or RRC information or DCI. In addition, the enhanced reduced-capability UE transmits, to the base station, the enhanced reduced-capability UE capability information.

In operation 1002, according to the embodiments of the disclosure, based on the information received from the base station, the enhanced reduced-capability UE may receive PDCCH and/or PDSCH or transmit PUSCH in the initial BWP dedicated to the enhanced reduced-capability UE/common initial BWP/normal BWP and control resource set #0/normalcontrol resource set by applying the information on the common initial BWP and control resource set #0, initial BWP dedicated to the enhanced reduced-capability UE, normal BWP and control resource set #0/normal control resource set.

Figure 11:
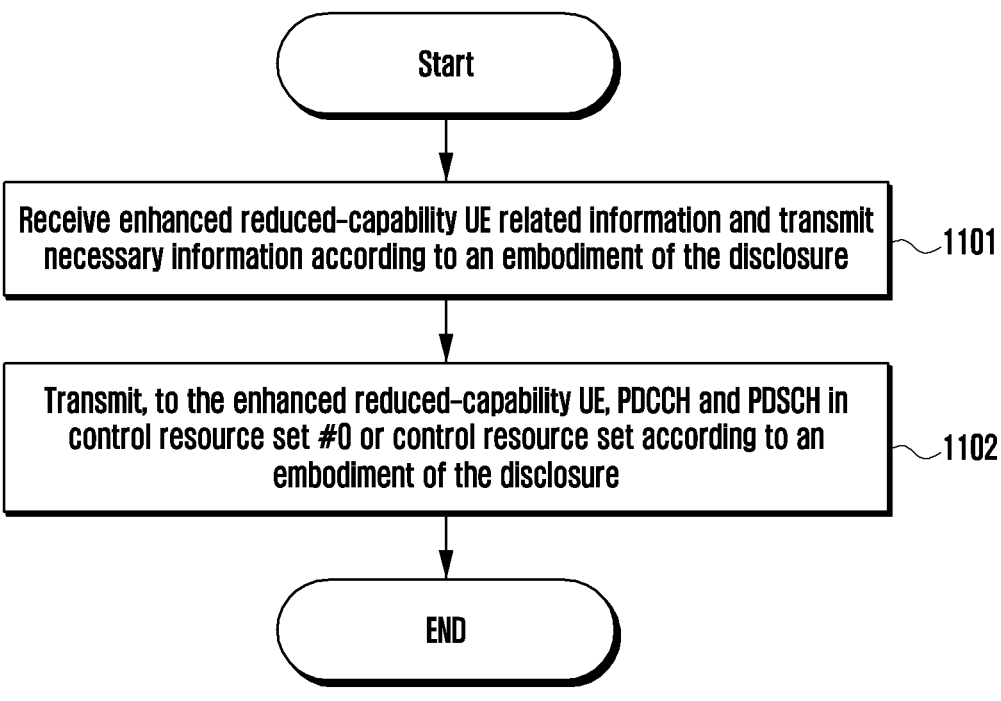
FIG. 11 is a flowchart illustrating a procedure of a base station in a wireless communication system according to an embodiment of the disclosure.

FIG. 11 is a flowchart illustrating a procedure of a base station in a wireless communication system according to an embodiment of the disclosure.

Referring to FIG. 11, in operation 1101, the base station transmits, to the enhanced reduced-capability UE, at least one piece of configuration information including information required to receive a common initial BWP and control resource set #0, an initial BWP and control resource set #0 dedicated to the enhanced reduced-capability UE, remaining normal BWPs excluding the initial BWPs, and remaining normal control resource sets excluding the control resource set #0, resource information for random access in the enhanced reduced-capability UE, TDD or FDD cell information, resource information on a configuration-based downlink signal or a configuration-based uplink signal, and full-duplex or half-duplex communication configuration information. In another embodiment, the configuration information may be provided to the UE through SIB or RRC information or DCI. In addition, the base station may receive the enhanced reduced-capability UE capability information from the enhanced reduced-capability UE.

In operation 1102, the base station may transmit PDCCH and/or PDSCH or receive PUSCH in the initial BWP dedicated to the enhanced reduced-capability UE/common initial BWP/normal BWP and control resource set #0/normal control resource set.

Figure 12:
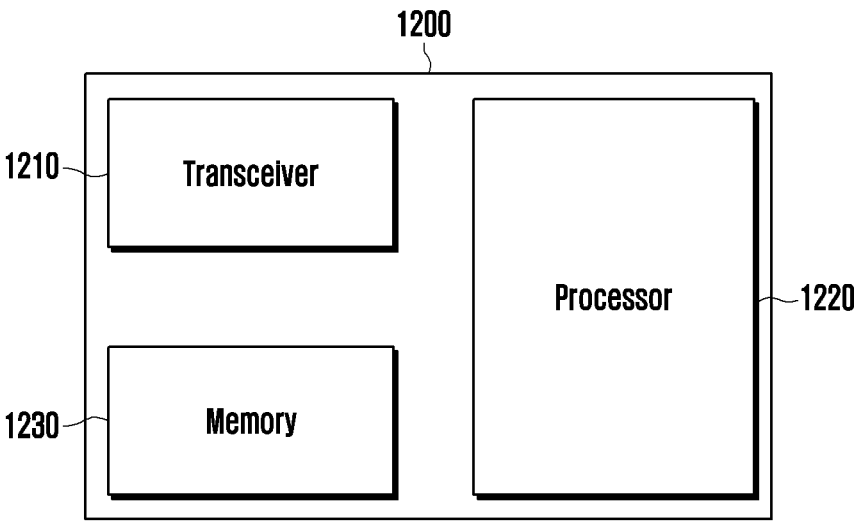
FIG. 12 is a block diagram illustrating a terminal according to an embodiment of the disclosure.

FIG. 12 is a block diagram illustrating a structure of a reduced-capability UE or normal UE performing an operation according to an embodiment of the disclosure.

Referring to FIG. 12, a UE 1200 may include a transceiver 1210, a processor 1220, and a memory 1230. As described above with reference to FIGS. 1 to 6, the UE 1200 according to the disclosure may operate according to the method described in the embodiments of FIGS. 7 to 11 in a wireless communication system to which the disclosure is applied. However, according to an embodiment, the components of the UE 1200 are not limited to the above-described example. According to yet another embodiment, the UE 1200 may further include more components than the above-described components, or may include fewer components in case of a reduced-capability UE. In addition, in a specific case, the transceiver 1210, the processor 1220, and the memory 1230 may be implemented in a single chip.

The transceiver 1210 may include a transmitter and a receiver according to another embodiment. The transceiver 1210 may transmit and receive signals to and from the base station. The signal may include control information and data. To this end, the transceiver 1210 may include an RF transmitter that up-converts and amplifies the frequency of a transmitted signal, an RF receiver that low-noise amplifies a received signal and down-converts the frequency thereof, and the like. Further, the transceiver 1210 may receive a signal through a radio channel, output the signal through the processor 1220, and transmit the signal output from the processor 1220 through a radio channel.

The processor 1220 may control a series of processes operable by the UE 1200 according to the above-described embodiment of the disclosure.

The memory 1230 may store control information or data such as transmission resource configuration included in a signal obtained from the UE 1200 and may have a region for storing data required for control of the processor 1220, data generated during control by the processor 1220, and the like.

Figure 13:
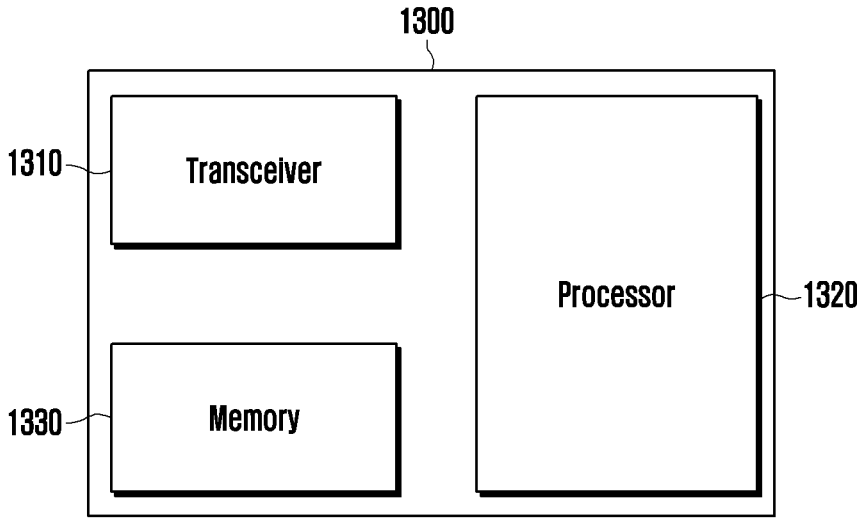
FIG. 13 is a block diagram illustrating a base station according to an embodiment of the disclosure.

FIG. 13 is a block diagram illustrating a constitution of a base station performing an operation according to an embodiment of the disclosure.

Referring to FIG. 13, a base station 1300 may include a transceiver 1310, a processor 1320, and a memory 1330. As described above with reference to FIGS. 1 to 6, the base station 1300 according to the disclosure may operate according to the schemes described in the embodiments of FIGS. 7 to 11 in a wireless communication system to which the disclosure is applied. However, according to an embodiment, the components of the base station 1300 are not limited to the above-described example. According to still another embodiment, the base station 1300 may further include more components than the above-described components, or may include fewer components. In addition, in a specific case, the transceiver 1310, the processor 1320, and the memory 1330 may be implemented in a single chip. The transceiver 1310 may include a transmitter and a receiver according to another embodiment. The transceiver 1310 may transmit and receive signals to and from the UE. The signal may include control information and data. To this end, the transceiver 1310 may include an RF transmitter that up-converts and amplifies the frequency of a transmitted signal, and an RF receiver that low-noise amplifies a received signal and down-converts the frequency thereof. Further, the transceiver 1310 may receive a signal through a radio channel, output the signal through the processor 1320, and transmit the signal output from the processor 1320 through a radio channel.

The processor 1320 may control a series of processes operable by the base station 1300 according to the above-described embodiment of the disclosure. The memory 1330 may store control information and data such as transmission resource configuration determined by the base station 1300 or control information and data received from the UE and may have a region for storing data required for control of the processor 1320 and data generated during control by the processor 1320.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a first physical downlink control channel (PDCCH) allocating resources for uplink data;
   based on the allocated resources being larger than a first bandwidth, mapping a physical uplink shared channel (PUSCH) to resources spanning the first bandwidth starting from a lowest resource block (RB) of the allocated resources; and
   transmitting, to the base station, the uplink data on the PUSCH,
   wherein the terminal supports a baseband for data transmission and reception having the first bandwidth and a radio frequency (RF) band having a second bandwidth, and wherein the first bandwidth is smaller than the second bandwidth.

2. The method of claim 1, wherein the first bandwidth is 5 MHz and the second bandwidth is 20 MHz.

3. The method of claim 1, wherein transmission of a physical random access channel (PRACH) indicating that the terminal is performing a random access procedure is deactivated, and wherein the uplink data is a message 3 (Msg3) of the random access procedure.

4. The method of claim 1, further comprising:

transmitting, to the base station, capability information on a PDCCH processing time of the terminal;

receiving, from the base station, a second PDCCH scheduling a system information block 1 (SIB1); and receiving, from the base station, the SIB1 based on the second PDCCH, wherein the SIB1 is received after the PDCCH processing time from receiving the second PDCCH.

5. The method of claim 4, wherein the second PDCCH includes a bitmap indicating at least one subband within a bandwidth part (BWP), and wherein the SIB1 is received based on the indicated at least one subband.

6. A method performed by a base station in a wireless communication system, the method comprising:

transmitting, to a terminal, a first physical downlink control channel (PDCCH) allocating resources for uplink data; and receiving, from the terminal, the uplink data on a physical uplink shared channel (PUSCH), wherein, based on the allocated resources being larger than a first bandwidth, the PUSCH is mapped to resources spanning the first bandwidth starting from a lowest resource block (RB) of the allocated resources, wherein the terminal supports a baseband for data transmission and reception having the first bandwidth and a radio frequency (RF) band having a second bandwidth, and wherein the first bandwidth is smaller than the second bandwidth.

7. The method of claim 6, wherein the first bandwidth is 5 MHz and the second bandwidth is 20 MHz.

8. The method of claim 6, wherein reception of a physical random access channel (PRACH) indicating that the terminal is performing a random access procedure is deactivated, and wherein the uplink data is a message 3 (Msg3) of the random access procedure.

9. The method of claim 6, further comprising:

receiving, from the terminal, capability information on a PDCCH processing time of the terminal;

transmitting, to the terminal, a second PDCCH scheduling a system information block 1 (SIB1); and transmitting, to the terminal, the SIB1 according to the second PDCCH, wherein the SIB1 is transmitted after the PDCCH processing time from transmitting the second PDCCH.

10. The method of claim 9, wherein the second PDCCH includes a bitmap indicating at least one subband within a bandwidth part (BWP), and wherein the SIB1 is transmitted based on the indicated at least one subband.

11. A terminal in a wireless communication system, the terminal comprising:

a transceiver; and at least one processor configured to:

receive, from a base station via the transceiver, a first physical downlink control channel (PDCCH) allocating resources for uplink data, and based on the allocated resources being larger than a first bandwidth, map a physical uplink shared channel (PUSCH) to resources spanning the first bandwidth starting from a lowest resource block (RB) of the allocated resources, and transmit, to the base station via the transceiver, the uplink data on the PUSCH, wherein the terminal supports a baseband for data transmission and reception having the first bandwidth and a radio frequency (RF) band having a second bandwidth, and wherein the first bandwidth is smaller than the second bandwidth.

12. The terminal of claim 11, wherein the first bandwidth is 5 MHz and the second bandwidth is 20 MHz.

13. The terminal of claim 11, wherein transmission of a physical random access channel (PRACH) indicating that the terminal is performing a random access procedure is deactivated, and wherein the uplink data is a message 3 (Msg3) of the random access procedure.

14. The terminal of claim 11, wherein the at least one processor is further configured to:

transmit, to the base station via the transceiver, capability information on a PDCCH processing time of the terminal, receive, from the base station via the transceiver, a second PDCCH scheduling a system information block 1 (SIB1), and receive, from the base station via the transceiver, the SIB1 based on the second PDCCH, and wherein the SIB1 is received after the PDCCH processing time from receiving the second PDCCH.

15. The terminal of claim 14, wherein the second PDCCH includes a bitmap indicating at least one subband within a bandwidth part (BWP), and wherein the SIB1 is received based on the indicated at least one subband.

16. A base station in a wireless communication system, the base station comprising:

a transceiver; and at least one processor of configured to:

transmit, to a terminal via the transceiver, a first physical downlink control channel (PDCCH) allocating resources for uplink data, and receive, from the terminal via the transceiver, the uplink data on a physical uplink shared channel (PUSCH), wherein, based on the allocated resources being larger than a first bandwidth, the PUSCH is mapped to resources spanning the first bandwidth starting from a lowest resource block (RB) of the allocated resources, wherein the terminal supports a baseband for data transmission and reception having the first bandwidth and a radio frequency (RF) band having a second bandwidth, and wherein the first bandwidth is smaller than the second bandwidth.

17. The base station of claim 16, wherein the first bandwidth is 5 MHz and the second bandwidth is 20 MHz.

18. The base station of claim 16, wherein reception of a physical random access channel (PRACH) indicating that the terminal is performing a random access procedure is deactivated, and wherein the uplink data is a message 3 (Msg3) of the random access procedure.

19. The base station of claim 16, wherein the at least one processor is further configured to;

receive, from the terminal via the transceiver, capability information on a PDCCH processing time of the terminal, and transmit, to the terminal via the transceiver, a second PDCCH scheduling a system information block 1 (SIB1); and transmit, to the terminal via the transceiver, the SIB1 according to the second PDCCH, and wherein the SIB1 is transmitted after the PDCCH processing time from transmitting the second PDCCH.

20. The base station of claim 19, wherein the second PDCCH includes a bitmap indicating at least one subband within a bandwidth part (BWP), and wherein the SIB1 is transmitted based on the indicated at least one subband.

\* \* \* \* \*